US012593036B2

(12) United States Patent　　(10) Patent No.:　US 12,593,036 B2
Lee　　(45) **Date of Patent:　\*Mar. 31, 2026**

(54) METHOD AND APPARATUS FOR PROCESSING VIDEO SIGNAL

(71) Applicant: KT CORPORATION, Gyeonggi-do (KR)

(72) Inventor: Bae Keun Lee, Seoul (KR)

(73) Assignee: KT CORPORATION, Gyeonggi-do (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 18/808,695

(22) Filed: Aug. 19, 2024

(65) Prior Publication Data

US 2024/0414330 A1　　Dec. 12, 2024

Related U.S. Application Data

(60) Continuation of application No. 18/211,408, filed on Jun. 19, 2023, now Pat. No. 12,095,987, which is a
(Continued)

(30) Foreign Application Priority Data

Dec. 7, 2016　(KR) ........................ 10-2016-0166057

(51) Int. Cl.
*H04N 19/11*　　(2014.01)
*H04N 19/105*　　(2014.01)
(Continued)

(52) U.S. Cl.
CPC .......... *H04N 19/11* (2014.11); *H04N 19/105* (2014.11); *H04N 19/117* (2014.11); *H04N 19/176* (2014.11); *H04N 19/70* (2014.11)

(58) Field of Classification Search
None
See application file for complete search history.

(56) References Cited

U.S. PATENT DOCUMENTS

| 2007/0009044 | A1 | 1/2007 | Tourapis et al. |
| 2007/0047648 | A1 | 3/2007 | Tourapis et al. |

(Continued)

FOREIGN PATENT DOCUMENTS

| CN | 1843038 A | 10/2006 |
| CN | 102469308 A | 5/2012 |

(Continued)

OTHER PUBLICATIONS

China National Intellectual Property Administration, Office Action of corresponding CN Patent Application No. 201780075487.1, Nov. 23, 2022.

(Continued)

*Primary Examiner* — Samuel D Fereja
(74) *Attorney, Agent, or Firm* — IP Legal Services, LLC

(57) ABSTRACT

A method for decoding a video according to the present invention may comprise: determining a first prediction mode for a first sub-block in a current block and a second intra prediction mode for a second sub-block, performing a first prediction for the first sub-block based on the first intra prediction mode, performing a second prediction for the second sub-block based on the second intra prediction mode, and obtaining a prediction sample of the current block according to a result of the first prediction and the second prediction.

7 Claims, 16 Drawing Sheets

Related U.S. Application Data continuation of application No. 17/467,716, filed on Sep. 7, 2021, now Pat. No. 11,736,686, which is a division of application No. 16/467,940, filed as application No. PCT/KR2017/014336 on Dec. 7, 2017, now Pat. No. 11,140,387.

(51) Int. Cl.
  *H04N 19/117* (2014.01)
  *H04N 19/176* (2014.01)
  *H04N 19/70* (2014.01)

(56) References Cited

U.S. PATENT DOCUMENTS

| | | |
|---|---|---|
| 2008/0117977 A1 | 5/2008 | Lee et al. |
| 2008/0246885 A1 | 10/2008 | Chung |
| 2012/0039388 A1 | 2/2012 | Kim et al. |
| 2012/0224777 A1 | 9/2012 | Kim et al. |
| 2014/0072041 A1 | 3/2014 | Seregin et al. |
| 2014/0133559 A1 | 5/2014 | Kim et al. |
| 2014/0184740 A1 | 7/2014 | Zhang et al. |
| 2014/0219334 A1 | 8/2014 | Park |
| 2014/0226720 A1 | 8/2014 | Park |
| 2014/0226912 A1 | 8/2014 | Lee et al. |
| 2014/0328403 A1 | 11/2014 | Lim et al. |
| 2015/0172717 A1 | 6/2015 | Zhao et al. |
| 2015/0222891 A1 | 8/2015 | Park |
| 2015/0222892 A1 | 8/2015 | Park |
| 2015/0222897 A1 | 8/2015 | Park |
| 2015/0222929 A1 | 8/2015 | Park |
| 2016/0316201 A1 | 10/2016 | Lee et al. |
| 2016/0353103 A1 | 12/2016 | Park |
| 2017/0251213 A1 | 8/2017 | Ye et al. |
| 2018/0048896 A1 | 2/2018 | Park et al. |
| 2018/0152701 A1 | 5/2018 | Park |
| 2018/0288410 A1 | 10/2018 | Park et al. |
| 2018/0332292 A1 | 11/2018 | Lin et al. |
| 2018/0359471 A1 | 12/2018 | Lee et al. |
| 2019/0166375 A1 | 5/2019 | Jun et al. |
| 2019/0289287 A1 | 9/2019 | Park |
| 2019/0394471 A1* | 12/2019 | Heo ..................... H04N 19/182 |
| 2020/0314420 A1 | 10/2020 | Park |

FOREIGN PATENT DOCUMENTS

| | | |
|---|---|---|
| CN | 104737537 A | 6/2015 |
| CN | 105338345 A | 2/2016 |
| JP | 2010-509800 A | 3/2010 |
| KR | 10-2014-0008503 A | 1/2014 |
| WO | 2006/026903 A1 | 3/2006 |
| WO | 2011/021844 A2 | 2/2011 |
| WO | 2012/035640 A1 | 3/2012 |
| WO | 2013/048033 A1 | 4/2013 |
| WO | 2014/010943 A1 | 1/2014 |
| WO | 2016/137166 A1 | 9/2016 |

OTHER PUBLICATIONS

Chen Changnian, "Research on Optimization Techniques in Intra Prediction of Video Coding", A Dissertation Submitted in Partial Fulfillment of the Requirements for the Degree of Doctor of Philosophy in Engineering, Jul. 2013, Huazhong University of Science and Technology, Wuhan, P.R. China.

China National Intellectual Property Administration, Notice of Allowance of corresponding CN Patent Application No. 201780075487. 1, Jun. 7, 2023.

* cited by examiner

FIG. 11

Neighboring sample

| P(-1,-1) | P(0,-1) | P(1,-1) | P(2,-1) | P(3,-1) | P(4,-1) |
| P(-1,0) | P(0,0) | P(1,0) | P(2,0) | P(3,0) |
| P(-1,1) | P(0,1) | P(1,1) | P(2,1) | P(3,1) |
| P(-1,2) | P(0,2) | P(1,2) | P(2,2) | P(3,2) |
| P(-1,3) | P(0,3) | P(1,3) | P(2,3) | P(3,3) |
| P(-1,4) |

Current sample

Filtering Region

P_ref_1D difference of distance (5) :
difference of x coordinates (1) + difference os y coordinates $$P'(x,y) == (1-w)^*P\_ref\_2nd + w^*P(w,y)$$

METHOD AND APPARATUS FOR PROCESSING VIDEO SIGNAL

CROSS REFERENCE TO RELATED APPLICATIONS

This application is a Continuation of U.S. patent application Ser. No. 18/211,408 (filed on Jun. 19, 2023), which is a Continuation of U.S. patent application Ser. No. 17/467,716 (filed on Sep. 7, 2021), now issued as U.S. Pat. No. 11,736,686, which is a Divisional of U.S. patent application Ser. No. 16/467,940 (filed on Jun. 7, 2019), now issued as U.S. Pat. No. 11,140,387, which is a National Stage Patent Application of PCT International Patent Application No. PCT/KR2017/014336 (filed on Dec. 7, 2017) under 35 U.S.C. § 371, which claims priority to Korean Patent Application No. 10-2016-0166057 (filed on Dec. 7, 2016), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is to provide a method and an apparatus for efficiently performing intra-prediction for an encoding/decoding target block in encoding/decoding a video signal.

An object of the present invention is to provide a method and an apparatus for performing intra prediction through a weighted prediction using a plurality of reference samples in encoding/decoding a video signal.

An object of the present invention is to provide a method and an apparatus for performing intra prediction using a plurality of intra prediction modes in encoding/decoding a video signal.

The technical objects to be achieved by the present invention are not limited to the above-mentioned technical problems. And, other technical problems that are not mentioned will be apparently understood to those skilled in the art from the following description.

Technical Solution

A method and an apparatus for decoding a video signal according to the present invention may determine a first prediction mode for a first sub-block in a current block and a second intra prediction mode for a second sub-block, perform a first prediction for the first sub-block based on the first intra prediction mode, perform a second prediction for the second sub-block based on the second intra prediction mode, and obtain a prediction sample of the current block according to a result of the first prediction and the second prediction.

A method and an apparatus for encoding a video signal according to the present invention may determine a first prediction mode for a first sub-block in a current block and a second intra prediction mode for a second sub-block, perform a first prediction for the first sub-block based on the first intra prediction mode, perform a second prediction for the second sub-block based on the second intra prediction mode, and obtain a prediction sample of the current block according to a result of the first prediction and the second prediction.

In the method and the apparatus for encoding/decoding a video signal according to the present invention, a prediction sample in an area corresponding to the first sub-block in the current block may be set as a first prediction sample obtained as a result of the first intra prediction, and a prediction sample in an area corresponding to the second sub-block may be set as a second prediction sample obtained as a result of the second intra prediction.

In the method and the apparatus for encoding/decoding a video signal according to the present invention, a prediction sample located at a boundary of the first sub-block and the second sub-block may be obtained based on a weighted sum of a first prediction sample obtained as a result of the first intra prediction and a second prediction sample obtained as a result of the second intra prediction.

In the method and the apparatus for encoding/decoding a video signal according to the present invention, weights applied to the first prediction sample and the second prediction sample may be determined based on a position of the prediction sample or a difference between the first intra prediction mode and the second intra prediction mode.

In the method and the apparatus for encoding/decoding a video signal according to the present invention, the second intra prediction mode may be derived from the first intra prediction mode.

In the method and the apparatus for encoding/decoding a video signal according to the present invention, the second intra prediction mode may be derived by adding a differential value to the first intra prediction mode.

In the method and the apparatus for encoding/decoding a video signal according to the present invention, the first intra prediction mode may be a directional prediction mode, and the second intra prediction mode may be a non-directional prediction mode.

The features briefly summarized above for the present invention are only illustrative aspects of the detailed description of the invention that follows, but do not limit the scope of the invention.

Advantageous Effects

According to the present invention, intra-prediction may be performed efficiently for an encoding/decoding target block.

According to the present invention, intra prediction can be performed based on a weighted prediction using a plurality of reference samples.

According to the present invention, intra prediction can be performed using a plurality of intra prediction modes.

The effects obtainable by the present invention are not limited to the above-mentioned effects, and other effects not mentioned can be clearly understood by those skilled in the art from the description below.

DESCRIPTION OF DRAWINGS

FIG. 11 is a diagram illustrating a method of correcting a prediction sample of a current block based on differential information of neighboring samples according to an embodiment of the present invention.

MODE FOR INVENTION

Figure 1:
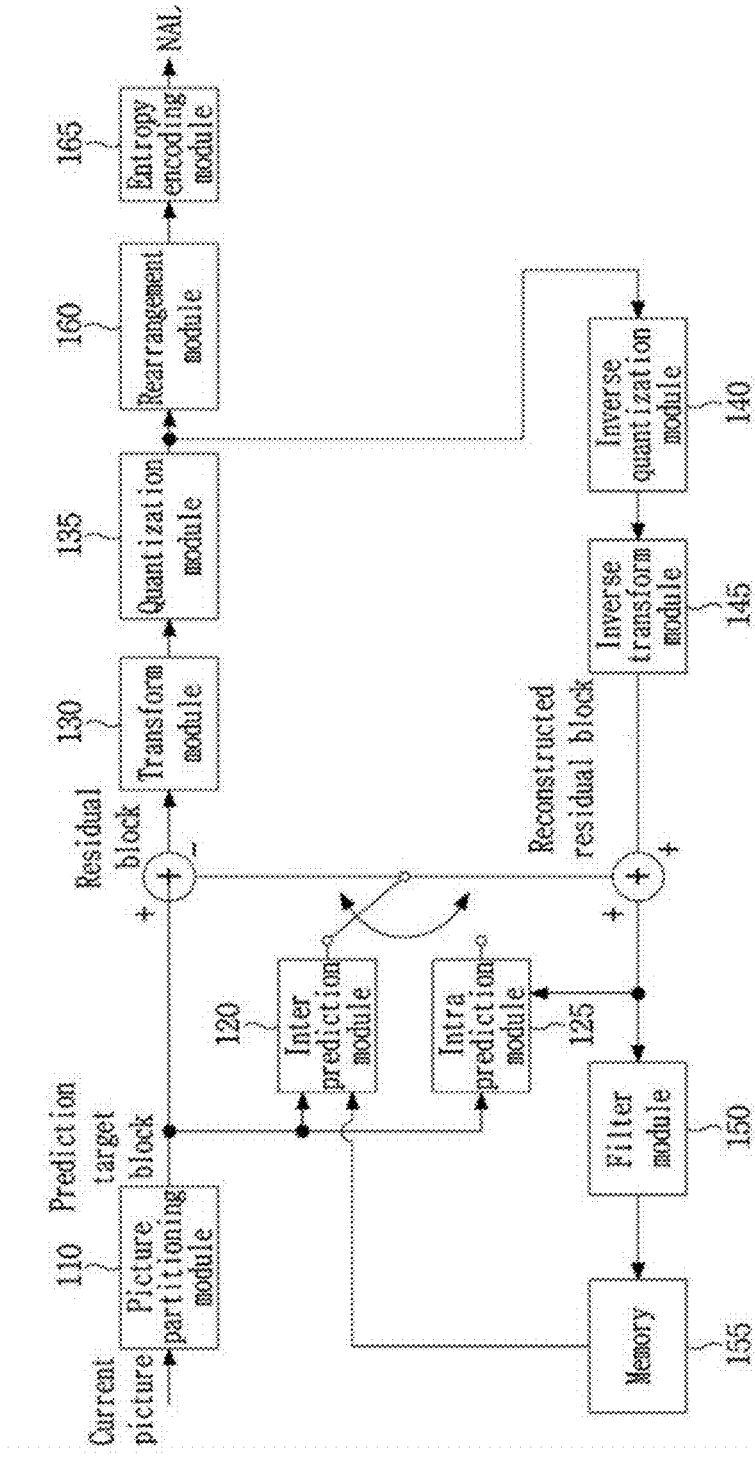
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
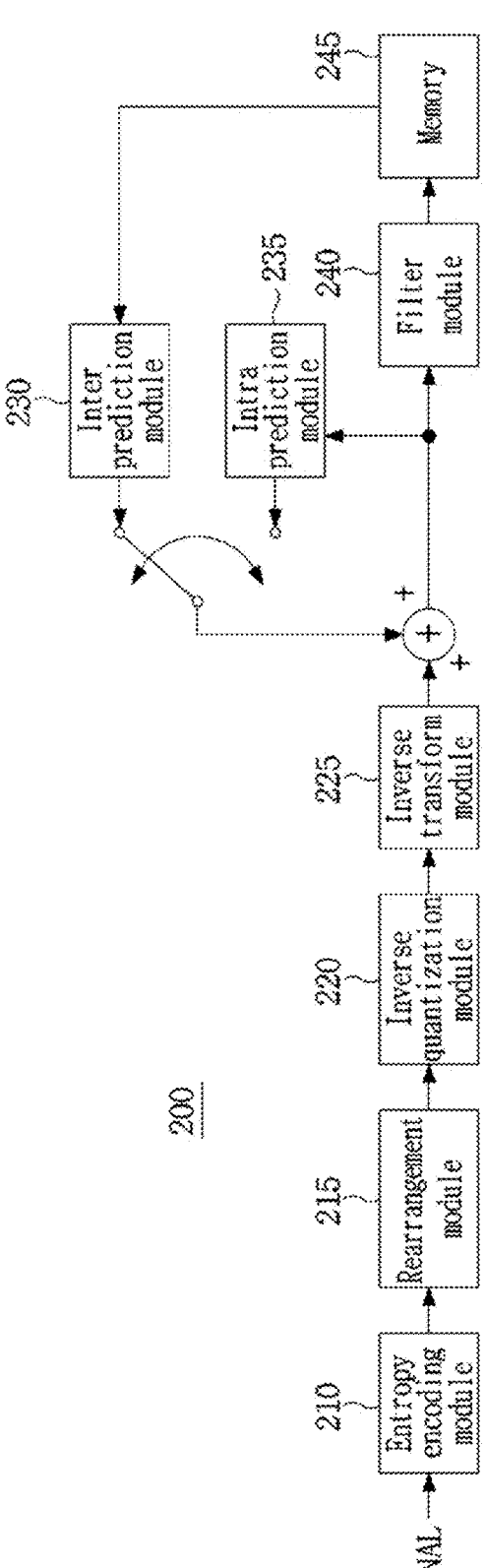
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is a base unit for performing prediction, quantization, transform or in-loop filtering and the like.

Partitioning of a coding tree unit or a coding unit may be performed based on at least one of a vertical line and a horizontal line. In addition, the number of vertical lines or horizontal lines partitioning the coding tree unit or the coding unit may be at least one or more. For example, the coding tree unit or the coding unit may be divided into two partitions using one vertical line or one horizontal line, or the coding tree unit or the coding unit may be divided into three partitions using two vertical lines or two horizontal lines. Alternatively, the coding tree unit or the coding unit may be partitioned into four partitions having a length and a width of ½ by using one vertical line and one horizontal line.

When a coding tree unit or a coding unit is divided into a plurality of partitions using at least one vertical line or at least one horizontal line, the partitions may have a uniform size or a different size. Alternatively, any one partition may have a different size from the remaining partitions.

In the embodiments described below, it is assumed that a coding tree unit or a coding unit is divided into a quad tree structure or a binary tree structure. However, it is also possible to divide a coding tree unit or a coding unit using a larger number of vertical lines or a larger number of horizontal lines.

Figure 3:
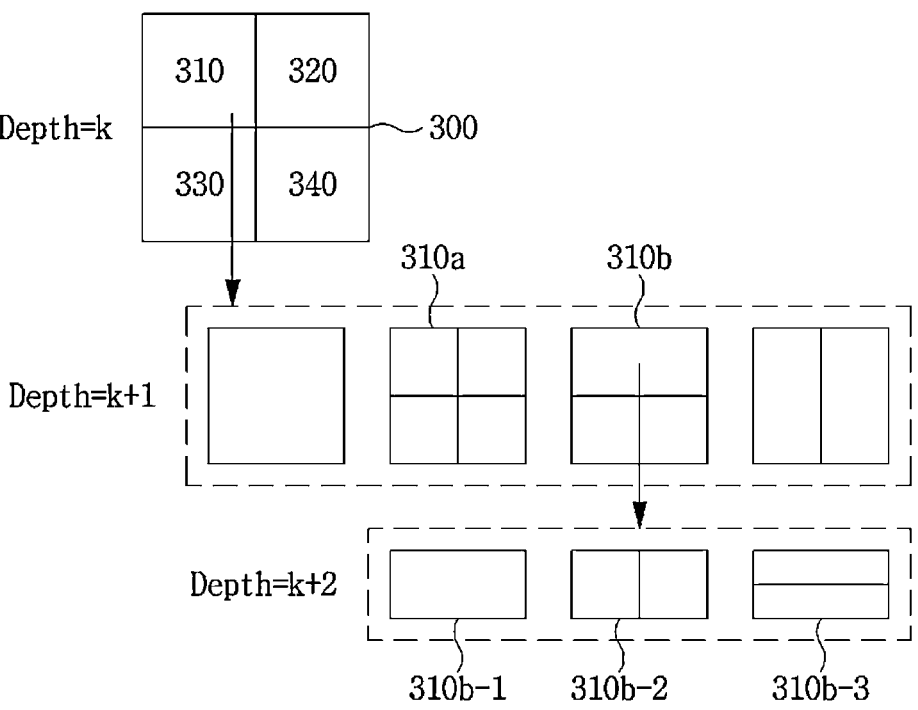
FIG. 3 is a diagram illustrating an example of hierarchically partitioning a coding block based on a tree structure according to an embodiment of the present invention.
Figure 4:
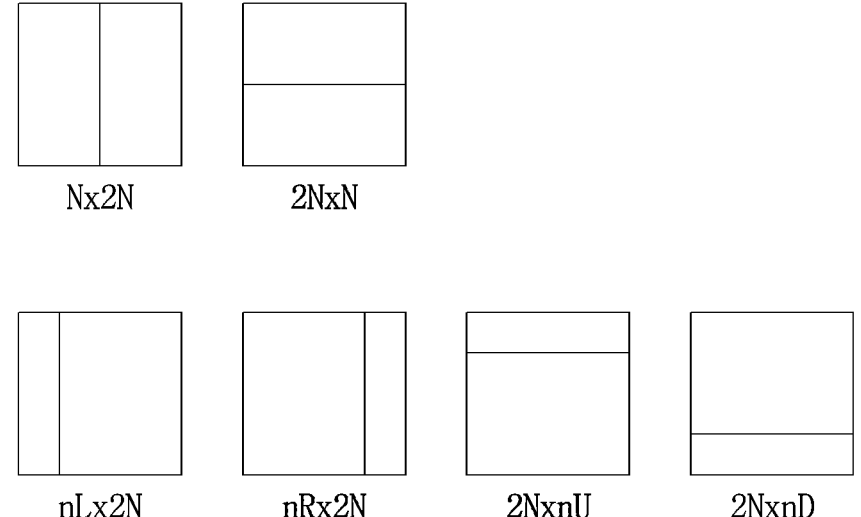
FIG. 4 is a diagram illustrating a partition type in which binary tree-based partitioning is allowed according to an embodiment of the present invention.

FIG. 3 is a diagram illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined in units of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks, and binary tree-based partitioning may mean that one coding block is partitioned into two coding blocks. Even if the binary tree-based partitioning is performed, a square-shaped coding block may exist in the lower depth.

Binary tree-based partitioning may be symmetrically or asymmetrically performed. The coding block partitioned based on the binary tree may be a square block or a non-square block, such as a rectangular shape. For example, a partition type in which the binary tree-based partitioning is allowed may comprise at least one of a symmetric type of 2N×N (horizontal directional non-square coding unit) or N×2N (vertical direction non-square coding unit), asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree partitioning. Constructing the coding tree unit with square blocks and symmetric non-square blocks may correspond to quad and binary tree CU partitioning.

Binary tree-based partitioning may be performed on a coding block where quad tree-based partitioning is no longer performed. Quad tree-based partitioning may no longer be performed on the coding block partitioned based on the binary tree.

Furthermore, partitioning of a lower depth may be determined depending on a partition type of an upper depth. For example, if binary tree-based partitioning is allowed in two or more depths, only the same type as the binary tree partitioning of the upper depth may be allowed in the lower depth. For example, if the binary tree-based partitioning in the upper depth is performed with 2N×N type, the binary tree-based partitioning in the lower depth is also performed with 2N×N type. Alternatively, if the binary tree-based partitioning in the upper depth is performed with N×2N type, the binary tree-based partitioning in the lower depth is also performed with N×2N type.

On the contrary, it is also possible to allow, in a lower depth, only a type different from a binary tree partitioning type of an upper depth.

It may be possible to limit only a specific type of binary tree based partitioning to be used for sequence, slice, coding tree unit, or coding unit. As an example, only 2N×N type or N×2N type of binary tree-based partitioning may be allowed for the coding tree unit. An available partition type may be predefined in an encoder or a decoder. Or information on available partition type or on unavailable partition type on may be encoded and then signaled through a bitstream.

Figure 5A:
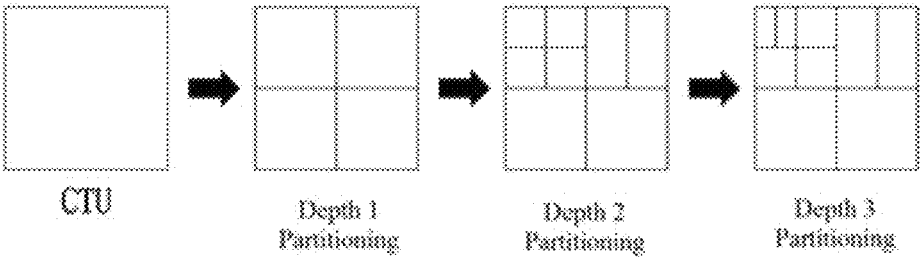
FIGS. 5A and 5B are diagrams illustrating an example in which only a binary tree-based partition of a pre-determined type is allowed according to an embodiment of the present invention.
Figure 5B:
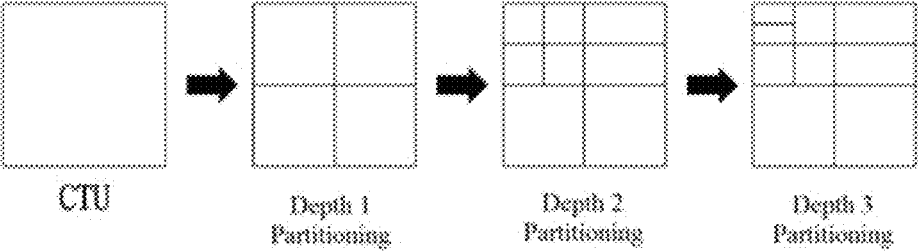

FIGS. 5A and 5B are diagrams illustrating an example in which only a specific type of binary tree-based partitioning is allowed. FIG. 5A shows an example in which only N×2N type of binary tree-based partitioning is allowed, and FIG. 5B shows an example in which only 2N×N type of binary tree-based partitioning is allowed. In order to implement adaptive partitioning based on the quad tree or binary tree, information indicating quad tree-based partitioning, information on the size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in a vertical direction or a horizontal direction, etc. may be used.

In addition, information on the number of times a binary tree partitioning is allowed, a depth at which the binary tree partitioning is allowed, or the number of the depths at which the binary tree partitioning is allowed may be obtained for a coding tree unit or a specific coding unit. The information may be encoded in units of a coding tree unit or a coding unit, and may be transmitted to a decoder through a bitstream.

For example, a syntax 'max_binary_depth_idx_minus1' indicating a maximum depth at which binary tree partitioning is allowed may be encoded/decoded through a bitstream.

In this case, max_binary_depth_idx_minus1+1 may indicate the maximum depth at which the binary tree partitioning is allowed.

Figure 6:
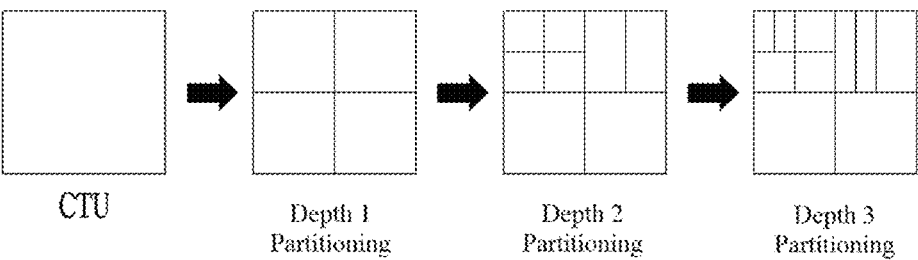
FIG. 6 is a diagram for explaining an example in which information related to the allowable number of binary tree partitioning is encoded/decoded, according to an embodiment to which the present invention is applied.

Referring to the example shown in FIG. 6, in FIG. 6, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth which the binary tree partitioning has been allowed in the coding tree unit (i.e., depth 3), or the number of depths in which the binary tree partitioning has been performed in the coding tree unit (i.e., 2 (depth 2 and depth 3)) may be encoded/decoded through a bitstream.

As another example, at least one of information on the number of times the binary tree partitioning is permitted, the depth at which the binary tree partitioning is allowed, or the number of the depths at which the binary tree partitioning is allowed may be obtained for each sequence or each slice. For example, the information may be encoded in units of a sequence, a picture, or a slice unit and transmitted through a bitstream. Accordingly, at least one of the number of the binary tree partitioning in a first slice, the maximum depth in which the binary tree partitioning is allowed in the first slice, or the number of depths in which the binary tree partitioning is performed in the first slice may be difference from a second slice. For example, in the first slice, binary tree partitioning may be permitted for only one depth, while in the second slice, binary tree partitioning may be permitted for two depths.

As another example, the number of times the binary tree partitioning is permitted, the depth at which the binary tree partitioning is allowed, or the number of depths at which the binary tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

A coding block is encoded using at least one of a skip mode, intra prediction, inter prediction, or a skip method. Once a coding block is determined, a prediction block may be determined through predictive partitioning of the coding block. The predictive partitioning of the coding block may be performed by a partition mode (Part_mode) indicating a partition type of the coding block. A size or a shape of the prediction block may be determined according to the partition mode of the coding block. For example, a size of a prediction block determined according to the partition mode may be equal to or smaller than a size of a coding block.

Figure 7:
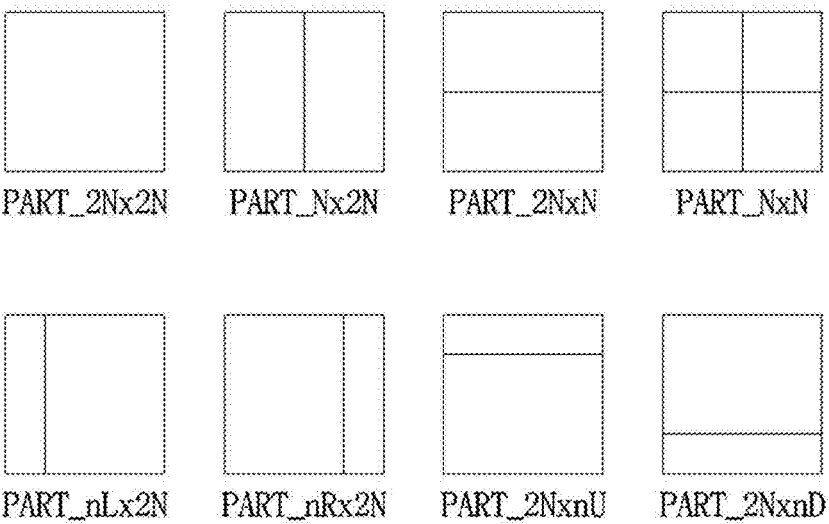
FIG. 7 is a diagram illustrating a partition mode applicable to a coding block according to an embodiment of the present invention.

FIG. 7 is a diagram illustrating a partition mode that may be applied to a coding block when the coding block is encoded by inter prediction.

When a coding block is encoded by inter prediction, one of 8 partitioning modes may be applied to the coding block, as in the example shown in FIG. 7.

When a coding block is encoded by intra prediction, a partition mode PART_2N×2N or a partition mode PART_N×N may be applied to the coding block.

PART_N×N may be applied when a coding block has a minimum size. Here, the minimum size of the coding block may be pre-defined in an encoder and a decoder. Or, information regarding the minimum size of the coding block may be signaled via a bitstream. For example, the minimum size of the coding block may be signaled through a slice header, so that the minimum size of the coding block may be defined per slice.

In general, a prediction block may have a size from 64×64 to 4×4. However, when a coding block is encoded by inter prediction, it may be restricted that the prediction block does not have a 4×4 size in order to reduce memory bandwidth when performing motion compensation.

Figure 8:
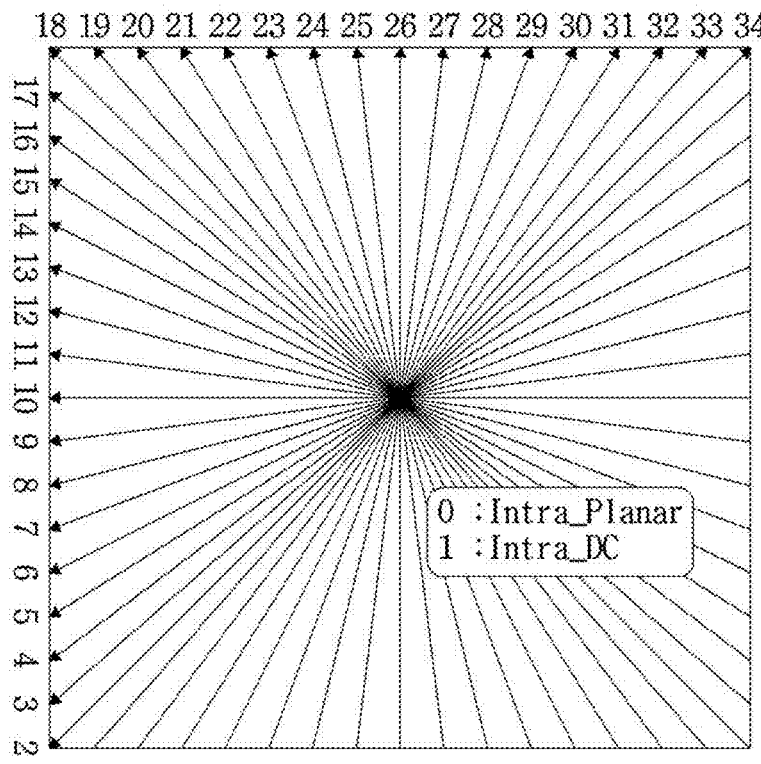
FIG. 8 is a diagram illustrating types of pre-defined intra prediction modes for a device for encoding/decoding a video according to an embodiment of the present invention.

FIG. 8 is a diagram illustrating types of pre-defined intra prediction modes for a device for encoding/decoding a video according to an embodiment of the present invention.

The device for encoding/decoding a video may perform intra prediction using one of pre-defined intra prediction modes. The pre-defined intra prediction modes for intra prediction may include non-directional prediction modes (e.g., a planar mode, a DC mode) and 33 directional prediction modes.

Alternatively, in order to enhance accuracy of intra prediction, a larger number of directional prediction modes than the 33 directional prediction modes may be used. That is, M extended directional prediction modes may be defined by subdividing angles of the directional prediction modes (M>33), and a directional prediction mode having a predetermined angle may be derived using at least one of the 33 pre-defined directional prediction modes.

A larger number of intra prediction modes than 35 intra prediction modes shown in FIG. 8 may be used. For example, a larger number of intra prediction modes than the 35 intra prediction modes can be used by subdividing angles of directional prediction modes or by deriving a directional prediction mode having a predetermined angle using at least one of a pre-defined number of directional prediction modes. At this time, the use of a larger number of intra prediction modes than the 35 intra prediction modes may be referred to as an extended intra prediction mode.

Figure 9:
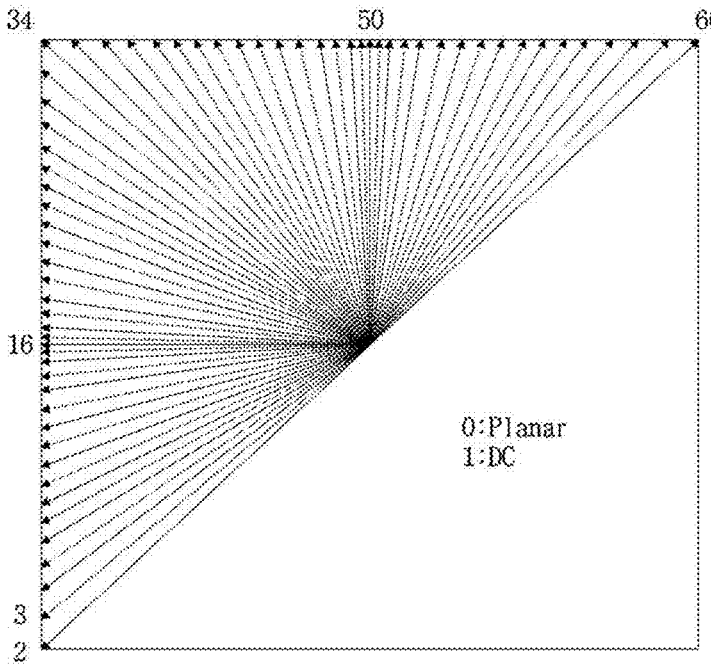
FIG. 9 is a diagram illustrating a kind of extended intra prediction modes according to an embodiment of the present invention.

FIG. 9 shows an example of extended intra prediction modes, and the extended intra prediction modes may include two non-directional prediction modes and 65 extended directional prediction modes. The same numbers of the extended intra prediction modes may be used for a luma component and a chroma component, or a different number of intra prediction modes may be used for each component. For example, 67 extended intra prediction modes may be used for the luma component, and 35 intra prediction modes may be used for the chroma component.

Alternatively, depending on the chroma format, a different number of intra prediction modes may be used in performing intra prediction. For example, in the case of the 4:2:0 format, 67 intra prediction modes may be used for the luma component to perform intra prediction and 35 intra prediction modes may be used for the chroma component. In the case of the 4:4:4 format, 67 intra prediction modes may be used for both the luma component and the chroma component to perform intra prediction.

Alternatively, depending on the size and/or shape of the block, a different number of intra prediction modes may be used to perform intra prediction. That is, depending on the size and/or shape of the PU or CU, 35 intra prediction modes or 67 intra prediction modes may be used to perform intra prediction. For example, when the CU or PU has the size less than 64×64 or is asymmetrically partitioned, 35 intra prediction modes may be used to perform intra prediction. When the size of the CU or PU is equal to or greater than 64×64, 67 intra prediction modes may be used to perform intra prediction. 65 directional intra prediction modes may be allowed for Intra_2N×2N, and only 35 directional intra prediction modes may be allowed for Intra_N×N.

A size of a block to which the extended intra prediction mode is applied may be set differently for each sequence, picture or slice. For example, it is set that the extended intra prediction mode is applied to a block (e.g., CU or PU) which has a size greater than 64×64 in the first slice. On the other hands, it is set that the extended intra prediction mode is applied to a block which has a size greater than 32×32 in the second slice. Information representing a size of a block to which the extended intra prediction mode is applied may be signaled through in units of a sequence, a picture, or a slice. For example, the information indicating the size of the block to which the extended intra prediction mode is applied may be defined as 'log 2_extended_intra_mode_size_minus4' obtained by taking a logarithm of the block size and then subtracting the integer 4. For example, if a value of log 2_extended_intra_mode_size_minus4 is 0, it may indicate that the extended intra prediction mode may be applied to a block having a size equal to or greater than 16×16. And if a value of log 2_extended_intra_mode_size_minus4 is 1, it may indicate that the extended intra prediction mode may be applied to a block having a size equal to or greater than 32×32.

As described above, the number of intra prediction modes may be determined in consideration of at least one of a color component, a chroma format, and a size or a shape of a block. In addition, the number of intra prediction mode candidates (e.g., the number of MPMs) used for determining an intra prediction mode of a current block to be encoded/decoded may also be determined according to at least one of a color component, a color format, and the size or a shape of a block. A method of determining an intra prediction mode of a current block to be encoded/decoded and a method of performing intra prediction using the determined intra prediction mode will be described with the drawings.

Figure 10:
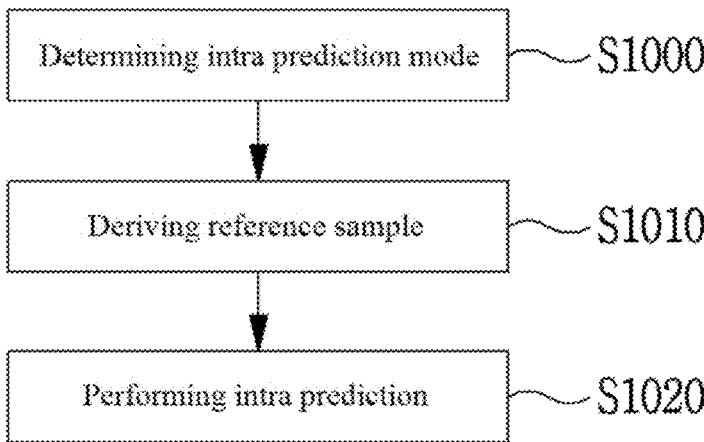
FIG. 10 is a flowchart briefly illustrating an intra prediction method according to an embodiment of the present invention.

FIG. 10 is a flowchart briefly illustrating an intra prediction method according to an embodiment of the present invention.

Referring to FIG. 10, an intra prediction mode of the current block may be determined at step S1000.

Specifically, the intra prediction mode of the current block may be derived based on a candidate list and an index. Here, the candidate list contains multiple candidates, and the multiple candidates may be determined based on an intra prediction mode of the neighboring block adjacent to the current block. The neighboring block may include at least one of blocks positioned at the top, the bottom, the left, the right, and the corner of the current block. The index may specify one of the multiple candidates of the candidate list. The candidate specified by the index may be set to the intra prediction mode of the current block.

An intra prediction mode used for intra prediction in the neighboring block may be set as a candidate. Also, an intra prediction mode having directionality similar to that of the intra prediction mode of the neighboring block may be set as a candidate. Here, the intra prediction mode having similar directionality may be determined by adding or subtracting a predetermined constant value to or from the intra prediction mode of the neighboring block. The predetermined constant value may be an integer, such as one, two, or more.

The candidate list may further include a default mode. The default mode may include at least one of a planar mode, a DC mode, a vertical mode, and a horizontal mode. The default mode may be adaptively added considering the maximum number of candidates that can be included in the candidate list of the current block.

The maximum number of candidates that can be included in the candidate list may be three, four, five, six, or more. The maximum number of candidates that can be included in the candidate list may be a fixed value preset in the device for encoding/decoding a video, or may be variably determined based on a characteristic of the current block. The characteristic may mean the location/size/shape of the block, the number/type of intra prediction modes that the block can use, a color type, a color format, etc. Alternatively, information indicating the maximum number of candidates that can be included in the candidate list may be signaled separately, and the maximum number of candidates that can be included in the candidate list may be variably determined using the information. The information indicating the maximum number of candidates may be signaled in at least one of a sequence level, a picture level, a slice level, and a block level.

When the extended intra prediction modes and the 35 pre-defined intra prediction modes are selectively used, the intra prediction modes of the neighboring blocks may be transformed into indexes corresponding to the extended intra prediction modes, or into indexes corresponding to the 35 intra prediction modes, whereby candidates can be derived. For transform to an index, a pre-defined table may be used, or a scaling operation based on a predetermined value may be used. Here, the pre-defined table may define a mapping relation between different intra prediction mode groups (e.g., extended intra prediction modes and 35 intra prediction modes).

For example, when the left neighboring block uses the 35 intra prediction modes and the intra prediction mode of the left neighboring block is 10 (a horizontal mode), it may be transformed into an index of 16 corresponding to a horizontal mode in the extended intra prediction modes.

Alternatively, when the top neighboring block uses the extended intra prediction modes and the intra prediction mode the top neighboring block has an index of 50 (a vertical mode), it may be transformed into an index of 26 corresponding to a vertical mode in the 35 intra prediction modes.

Based on the above-described method of determining the intra prediction mode, the intra prediction mode may be derived independently for each of the luma component and the chroma component, or the intra prediction mode of the chroma component may be derived depending on the intra prediction mode of the luma component.

Specifically, the intra prediction mode of the chroma component may be determined based on the intra prediction mode of the luma component as shown in the following Table 1.

TABLE 1

| | IntraPredModeY[xCb][yCb] | | | | |
|---|---|---|---|---|---|
| Intra_chroma_pred_mode[xCb][yCb] | 0 | 26 | 10 | 1 | X(0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

In Table 1, intra_chroma_pred_mode means information signaled to specify the intra prediction mode of the chroma component, and IntraPredModeY indicates the intra prediction mode of the luma component.

Referring to FIG. 10, a reference sample for intra prediction of the current block may be derived at step S1010.

Specifically, a reference sample for intra prediction may be derived based on a neighboring sample of the current block. The neighboring sample may be a reconstructed sample of the neighboring block, and the reconstructed sample may be a reconstructed sample before an in-loop filter is applied or a reconstructed sample after the in-loop filter is applied.

A neighboring sample reconstructed before the current block may be used as the reference sample, and a neighboring sample filtered based on a predetermined intra filter may be used as the reference sample. Filtering of neighboring samples using an intra filter may also be referred to as reference sample smoothing. The intra filter may include at least one of the first intra filter applied to multiple neighboring samples positioned on the same horizontal line and the second intra filter applied to multiple neighboring samples positioned on the same vertical line. Depending on the positions of the neighboring samples, one of the first intra filter and the second intra filter may be selectively applied, or both intra filters may be applied. At this time, at least one filter coefficient of the first intra filter or the second intra filter may be (1, 2, 1), but is not limited thereto.

Filtering may be adaptively performed based on at least one of the intra prediction mode of the current block and the size of the transform block for the current block. For example, when the intra prediction mode of the current block is the DC mode, the vertical mode, or the horizontal mode, filtering may not be performed. When the size of the transform block is N×M, filtering may not be performed. Here, N and M may be the same values or different values, or may be values of 4, 8, 16, or more. For example, if the size of the transform block is 4×4, filtering may not be performed. Alternatively, filtering may be selectively performed based on the result of a comparison of a pre-defined threshold and the difference between the intra prediction mode of the current block and the vertical mode (or the horizontal mode). For example, when the difference between the intra prediction mode of the current block and the vertical mode is greater than a threshold, filtering may be performed. The threshold may be defined for each size of the transform block as shown in Table 2.

TABLE 2

|           | 8 × 8 transform | 16 × 16 transform | 32 × 32 transform |
|-----------|-----------------|-------------------|-------------------|
| Threshold | 7               | 1                 | 0                 |

The intra filter may be determined as one of multiple intra filter candidates pre-defined in the device for encoding/decoding a video. To this end, an index specifying an intra filter of the current block among the multiple intra filter candidates may be signaled. Alternatively, the intra filter may be determined based on at least one of the size/shape of the current block, the size/shape of the transform block, information on the filter strength, and variations of the neighboring samples.

Referring to FIG. 10, intra prediction may be performed using the intra prediction mode of the current block and the reference sample at step S1020.

That is, the prediction sample of the current block may be obtained using the intra prediction mode determined at step S1000 and the reference sample derived at step S1010. However, in the case of intra prediction, a boundary sample of the neighboring block may be used, and thus quality of the prediction picture may be decreased. Therefore, a correction process may be performed on the prediction sample generated through the above-described prediction process, and will be described in detail with reference to FIGS. 11 to 13. However, the correction process is not limited to being applied only to the intra prediction sample, and may be applied to an inter prediction sample or the reconstructed sample.

FIG. 11 is a diagram illustrating a method of correcting a prediction sample of a current block based on differential information of neighboring samples according to an embodiment of the present invention.

The prediction sample of the current block may be corrected based on the differential information of multiple neighboring samples for the current block. The correction may be performed on all prediction samples in the current block, or may be performed on prediction samples in pre-determined partial regions. The partial regions may be one row/column or multiple rows/columns, and these may be preset regions for correction in the device for encoding/decoding a video. For example, correction may be performed on a one row/column located at a boundary of the current block or may be performed on plurality of rows/columns from a boundary of the current block. Alternatively, the partial regions may be variably determined based on at least one of the size/shape of the current block and the intra prediction mode.

The neighboring samples may belong to the neighboring blocks positioned at the top, the left, and the top left corner of the current block. The number of neighboring samples used for correction may be two, three, four, or more. The positions of the neighboring samples may be variably determined depending on the position of the prediction sample which is the correction target in the current block. Alternatively, some of the neighboring samples may have fixed positions regardless of the position of the prediction sample which is the correction target, and the remaining neighboring samples may have variable positions depending on the position of the prediction sample which is the correction target.

The differential information of the neighboring samples may mean a differential sample between the neighboring samples, or may mean a value obtained by scaling the differential sample by a predetermined constant value (e.g., one, two, three, etc.). Here, the predetermined constant value may be determined considering the position of the prediction sample which is the correction target, the position of the column or row including the prediction sample which is the correction target, the position of the prediction sample within the column or row, etc.

For example, when the intra prediction mode of the current block is the vertical mode, differential samples between the top left neighboring sample p(−1, −1) and neighboring samples p (−1, y) adjacent to the left boundary of the current block may be used to obtain the final prediction sample as shown in Equation 1.

$$P'(0, y) = \qquad\qquad\qquad\qquad\qquad\qquad\text{[Equation 1]}$$

$$P(0, y) + \big((p(-1, y) - p(-1, -1)\big) \gg 1 \text{ for } y = 0 \dots N - 1$$

For example, when the intra prediction mode of the current block is the horizontal mode, differential samples between the top left neighboring sample p(−1, −1) and neighboring samples p(x, −1) adjacent to the top boundary of the current block may be used to obtain the final prediction sample as shown in Equation 2.

$$P'(x, 0) = \quad \text{[Equation 2]}$$
$$p(x, 0) + ((p(x, -1) - p(-1, -1)) \gg 1 \text{ for } x = 0 \dots N - 1$$

For example, when the intra prediction mode of the current block is the vertical mode, differential samples between the top left neighboring sample $p(-1, -1)$ and neighboring samples $p(-1, y)$ adjacent to the left boundary of the current block may be used to obtain the final prediction sample. Here, the differential sample may be added to the prediction sample, or the differential sample may be scaled by a predetermined constant value, and then added to the prediction sample. The predetermined constant value used in scaling may be determined differently depending on the column and/or row. For example, the prediction sample may be corrected as shown in Equation 3 and Equation 4.

$$P'(0, y) = \quad \text{[Equation 3]}$$
$$P(0, y) + ((p(-1, y) - p(-1, -1)) \gg 1 \text{ for } y = 0 \dots N - 1$$

$$P'(1, y) = \quad \text{[Equation 4]}$$
$$P(1, y) + ((p(-1, y) - p(-1, -1)) \gg 2 \text{ for } y = 0 \dots N - 1$$

For example, when the intra prediction mode of the current block is the horizontal mode, differential samples between the top left neighboring sample $p(-1, -1)$ and neighboring samples $p(x, -1)$ adjacent to the top boundary of the current block may be used to obtain the final prediction sample, as described in the case of the vertical mode. For example, the prediction sample may be corrected as shown in Equation 5 and Equation 6.

$$P'(x, 0) = \quad \text{[Equation 5]}$$
$$p(x, 0) + ((p(x, -1) - p(-1, -1)) \gg 1 \text{ for } x = 0 \dots N - 1$$

$$P'(x, 1) = \quad \text{[Equation 6]}$$
$$p(x, 1) + ((p(x, -1) - p(-1, -1)) \gg 2 \text{ for } x = 0 \dots N - 1$$

Figure 12:
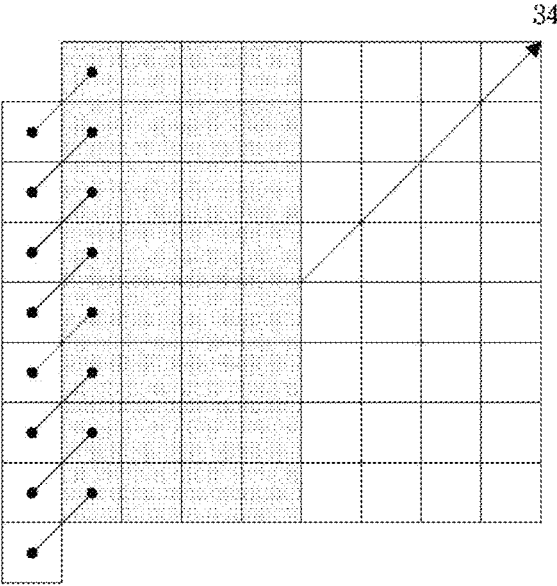
FIGS. 12 and 13 are diagrams illustrating a method of correcting a prediction sample based on a predetermined correction filter according to an embodiment of the present invention.
Figure 13:
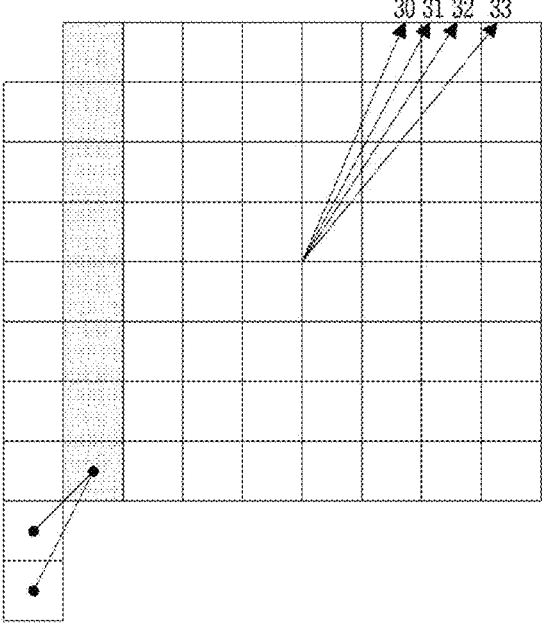

FIGS. 12 and 13 are diagrams illustrating a method of correcting a prediction sample based on a predetermined correction filter according to an embodiment of the present invention.

The prediction sample may be corrected based on the neighboring sample of the prediction sample which is the correction target and a predetermined correction filter. Here, the neighboring sample may be specified by an angular line of the directional prediction mode of the current block, or may be at least one sample positioned on the same angular line as the prediction sample which is the correction target. Also, the neighboring sample may be a prediction sample in the current block, or may be a reconstructed sample in a neighboring block reconstructed before the current block.

At least one of the number of taps, strength, and a filter coefficient of the correction filter may be determined based on at least one of the position of the prediction sample which is the correction target, whether or not the prediction sample which is the correction target is positioned on the boundary of the current block, the intra prediction mode of the current block, angle of the directional prediction mode, the prediction mode (inter or intra mode) of the neighboring block, and the size/shape of the current block.

Referring to FIG. 12, when the directional prediction mode has an index of 2 or 34, at least one prediction/reconstructed sample positioned at the bottom left of the prediction sample which is the correction target and the predetermined correction filter may be used to obtain the final prediction sample. Here, the prediction/reconstructed sample at the bottom left may belong to a previous line of a line including the prediction sample which is the correction target. The prediction/reconstructed sample at the bottom left may belong to the same block as the current sample, or to neighboring block adjacent to the current block.

Filtering for the prediction sample may be performed only on the line positioned at the block boundary, or may be performed on multiple lines. The correction filter where at least one of the number of filter taps and a filter coefficient is different for each of lines may be used. For example, a ($\frac{1}{2}$, $\frac{1}{2}$) filter may be used for the left first line closest to the block boundary, a ($\frac{12}{16}$, $\frac{4}{16}$) filter may be used for the second line, a ($\frac{14}{16}$, $\frac{2}{16}$) filter may be used for the third line, and a ($\frac{15}{16}$, $\frac{1}{16}$) filter may be used for the fourth line.

Alternatively, when the directional prediction mode has an index of 3 to 6 or 30 to 33, filtering may be performed on the block boundary as shown in FIG. 13, and a 3-tap correction filter may be used to correct the prediction sample. Filtering may be performed using the bottom left sample of the prediction sample which is the correction target, the bottom sample of the bottom left sample, and a 3-tap correction filter that takes as input the prediction sample which is the correction target. The position of neighboring sample used by the correction filter may be determined differently based on the directional prediction mode. The filter coefficient of the correction filter may be determined differently depending on the directional prediction mode.

Different correction filters may be applied depending on whether the neighboring block is encoded in the inter mode or the intra mode. When the neighboring block is encoded in the intra mode, a filtering method where more weight is given to the prediction sample may be used, compared to when the neighboring block is encoded in the inter mode. For example, in the case of that the intra prediction mode is 34, when the neighboring block is encoded in the inter mode, a ($\frac{1}{2}$, $\frac{1}{2}$) filter may be used, and when the neighboring block is encoded in the intra mode, a ($\frac{4}{16}$, $\frac{12}{16}$) filter may be used.

The number of lines to be filtered in the current block may vary depending on the size/shape of the current block (e.g., the coding block or the prediction block). The number of lines to be filtered may be different according to whether a size of the current block is greater than a pre-defined size, or whether the current block has a square shape or a non-square shape. For example, as illustrated in FIG. 14, when the size of the current block is equal to or less than 32×32, filtering may be performed on only one line at the block boundary; otherwise, filtering may be performed on multiple lines including the one line at the block boundary.

Figure 14:
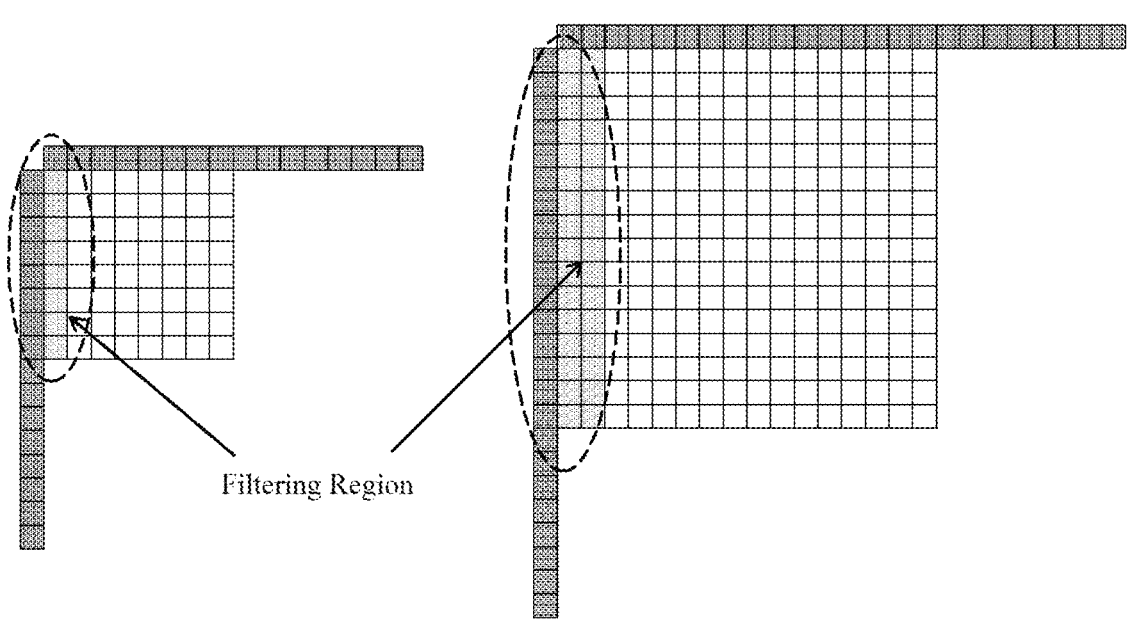
FIG. 14 shows an example in which an application range of a correction filter is variably determined according to a size of a current block according to an embodiment of the present invention.

FIGS. 12 to 14 are based on the case where the 35 intra prediction modes in FIG. 7 are used, but may be equally/similarly applied to the case where the extended intra prediction modes are used.

When an intra prediction mode of a current block is a directional prediction mode, intra prediction of the current block may be performed based on a directionality of the directional prediction mode. For example, Table 3 shows intra direction parameters (intraPredAng) of Mode 2 to Mode 34, which are directional intra prediction modes shown in FIG. 8.

so that the one-dimensional reference sample group is generated which the left reference samples and the top reference samples are arranged in the horizontal direction.

TABLE 3

| | predModeIntra | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| intraPredAng | — | 32 | 26 | 21 | 17 | 13 | 9 | 5 | 2 | 0 | −2 | −5 | −9 | −13 | −17 | −21 |

| | predModeIntra | | | | | | | | | | | | | | | |
|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 |
| intraPredAng | −32 | −26 | −21 | −17 | −13 | −9 | −5 | −2 | 0 | 2 | 5 | 9 | 13 | 17 | 21 | 26 |

In Table 3, although 33 directional intra prediction modes are exemplified, it is also possible that more or fewer directional intra prediction modes are defined.

Based on a lookup table defining a mapping relationship between a directional intra prediction mode and an intra direction parameter, an intra direction parameter for the current block may be determined. Alternatively, an intra direction parameter for the current block may be determined based on information signaled through a bitstream.

Intra prediction of the current block may be performed using at least one of a left reference sample or a top reference sample, depending on the directionality of the directional intra prediction mode. Here, the top reference sample means a reference sample (e.g., (−1, −1) to (2W−1, −1)) having a y-axis coordinate smaller than a prediction sample (x, 0) included in the top most row in the current block and the left reference sample means a reference sample (e.g., (−1, −1) to (−1, 2H−1)) having an x-axis coordinate smaller than a prediction sample (0, y) included in a left most column in the current block.

It is possible to arrange reference samples of the current block in one dimension according to the directionality of the intra prediction mode. Specifically, when both the top reference sample and the left reference sample are to be used in the intra prediction of the current block, it is possible to select reference samples for each prediction target sample, assuming that they are arranged in a line in a vertical direction or a horizontal direction.

For example, when the intra direction parameter is negative (for example, in the case of intra prediction modes corresponding to Mode 11 to Mode 25 in Table 3), a one-dimensional reference sample group (P_ref_1D) may be constructed by rearranging top reference samples and left reference samples in the horizontal direction or the vertical direction.

Figure 15:
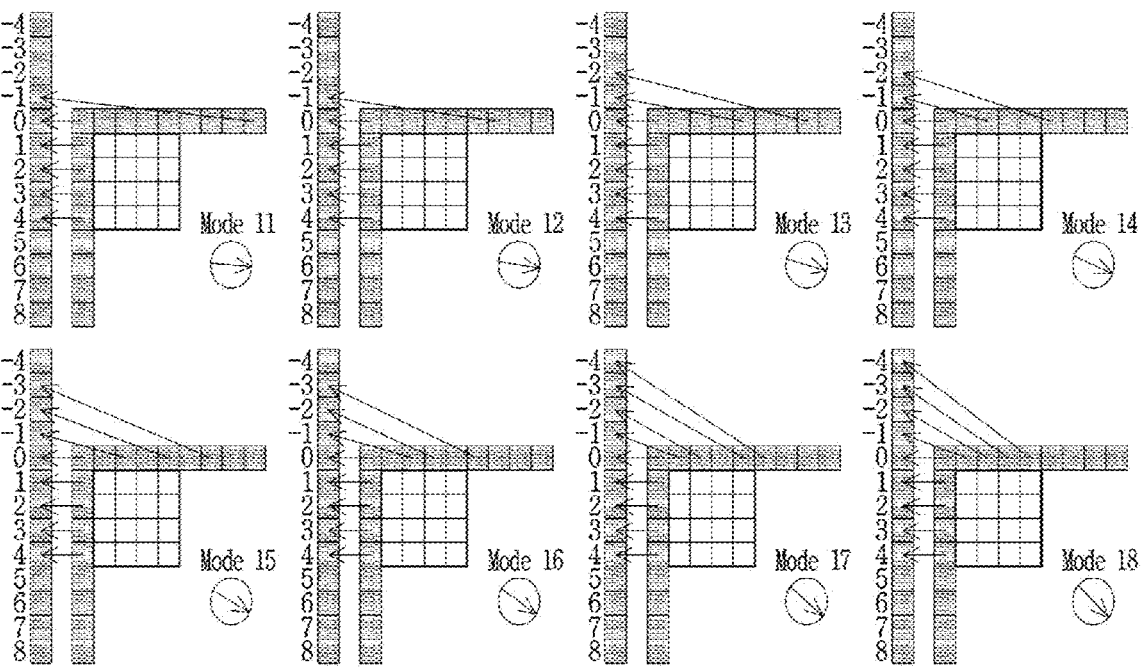
FIGS. 15 and 16 are diagrams illustrating a one-dimensional reference sample group in which reference samples are rearranged in a line.
Figure 16:
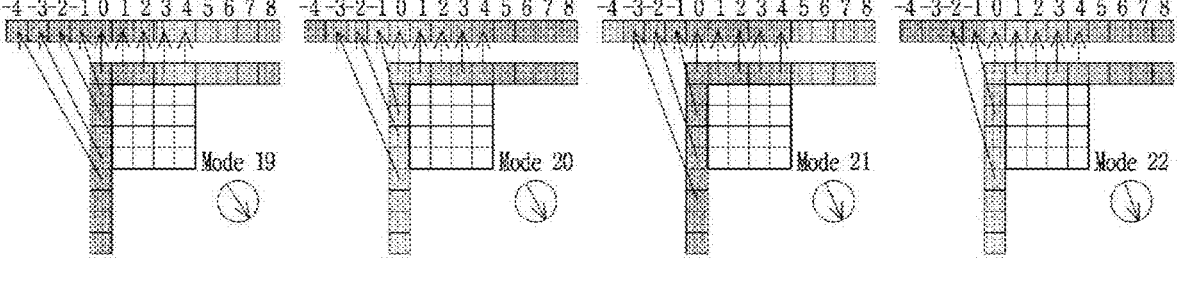
Figure 16:
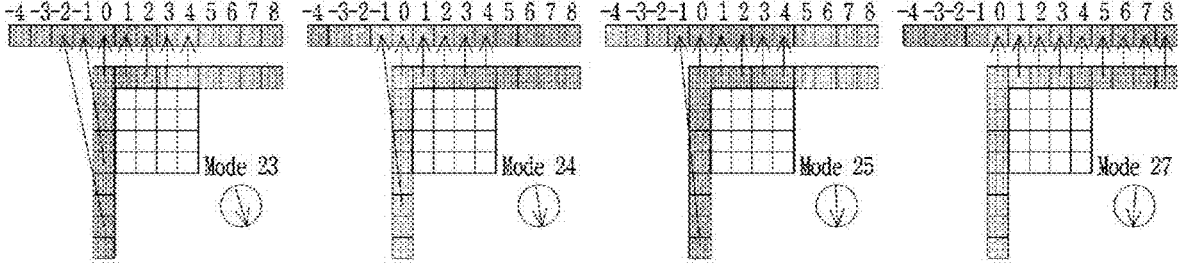

FIGS. 15 and 16 are diagrams illustrating a one-dimensional reference sample group in which reference samples are rearranged in a line.

Whether the reference samples are rearranged in the vertical direction or in the horizontal direction may be determined according to the directionality of the intra prediction mode. For example, as in the example shown in FIG. 15, if the intra prediction mode index is in 11 to 18, the top reference samples of the current block are rotated counterclockwise so that the one-dimensional reference sample group is generated which the left reference samples and the top reference samples are arranged in the vertical direction.

On the other hand, as in the example shown in FIG. 16, when the intra prediction mode index is in 19 to 25, the left reference samples of the current block are rotated clockwise If the intra direction parameter of the current block is not negative, intra prediction for the current block may be performed using only the left reference samples or the top reference samples. Thereby, the one-dimensional reference sample group for intra prediction modes whose intra direction parameters are not negative may be generated by using only the left reference samples or the top reference samples.

Based on the intra direction parameter, a reference sample determination index iIdx may be derived for specifying at least one reference sample used to predict the prediction target sample. In addition, a weight-related parameter $i_{fact}$, which is used to determine weights applied to each reference sample, may be derived based on the intra direction parameter. For example, the following Equations 7 and 8 show examples of deriving the reference sample determination index and the weight-related parameter.

$$iIdx = (y+1) * \left( P_{ang}/32 \right) \qquad \text{[Equation 7]}$$

$$ifact = [(y+1) * P_{ang}]31$$

Based on the reference sample determination index, at least one reference sample may be specified for each prediction target sample. For example, based on the reference sample determination index, a position of a reference sample in the one-dimensional reference sample group for predicting the prediction target sample in the current block may be specified. Based on the reference sample at the specified position, a prediction image (i.e., a prediction sample) for the prediction target sample may be generated.

When the intra-prediction mode of the current block is considered, if it is determined that the prediction target sample cannot be predicted by only one reference sample, prediction of the prediction target sample may be performed using a plurality of reference samples. Specifically, in accordance with the intra prediction mode of the current block, it is possible to perform prediction on the prediction target sample by interpolating a reference sample at a predetermined position and a neighboring reference sample neighboring the reference sample at the predetermined position.

For example, when an imaginary angular line following a slope of the intra prediction mode or an angle of the intra prediction mode does not pass an integer pel (i.e., a reference sample at an integer position) in the one-dimensional reference sample group, a prediction image for the prediction target sample may be generated by interpolating a reference sample positioned on the angular line and a reference sample adjacent to a left/right or top/bottom side of the reference sample. For example, the following Equation 8 shows an example of interpolating two or more reference samples to generate a prediction sample P (x, y) for the prediction target sample.

$$P(x, y) = (32 - i_{fact})/32 * P\_ref\_1D(x + iIdx + 1) +$$ [Equation 8]

$$i_{fact}/32 * P\_ref\_1D(x + iIdx + 2)$$

Coefficients of an interpolation filter may be determined based on the weight-related parameter $i_{fact}$. For example, the coefficients of the interpolation filter may be determined based on a distance between a fractional pel located on the angular line and an integer pel (i.e., an integer position of each reference sample).

When the intra prediction mode of the current block is considered, if the prediction target sample can be predicted by only one reference sample, a prediction image for the prediction target sample may be generated based on a reference sample specified by the intra prediction mode of the current block.

For example, an imaginary angular line following a slope of the intra prediction mode or an angle of the intra prediction mode passes an integer pel (i.e., a reference sample at an integer position) in the one-dimensional reference sample group, a prediction image for the prediction target sample may be generated by copying a reference sample at the integer pel or by considering a distance between a reference sample at the integer pel and the prediction target sample. For example, the following Equation 9 is an example of generating a prediction image P(x,y) for the prediction target sample by copying a reference sample P_ref_1D(x+iIdx+1) in the one-dimensional sample group specified by the intra prediction mode of the current block.

$$P(x, y) = P\_ref\_1D(x + iIdx + 1)$$ [Equation 9]

For convenience of explanation, in the embodiments described later, a reference sample specified by the intra prediction mode of the current block or an one-dimensional reference sample specified by the intra prediction mode of the current block will be referred to as a first reference sample. For example, in a planar mode, reference samples used to obtain a horizontal prediction image or a vertical prediction image of the prediction target sample may be referred to as first reference samples, and in a directional intra prediction mode, a reference sample of the prediction target sample specified by the directionality of the intra prediction mode may be referred to as a first prediction reference sample. In addition, a prediction sample generated by predicting the prediction target sample based on the first reference sample will be referred to as a first prediction image (or a first prediction sample), and intra prediction using the first reference sample will be referred to as a first intra prediction.

According to the present invention, in order to increase the efficiency of intra prediction, it is possible to obtain a second prediction image (or a second prediction sample) for the prediction target sample by using a second reference sample at a predetermined position. Specifically, the second prediction sample for the prediction target sample may be generated by weight-prediction of the first prediction image generated as a result of the first intra prediction and the second reference sample at the predetermined position.

Whether or not to generate the second prediction sample may be determined based on a size of the current block, a shape of the current block, an intra prediction mode of the current block (for example, whether it is a directional intra prediction mode), a direction of the intra prediction mode, a distance between the prediction target sample and the first reference sample and the like. Here, the distance between the first reference sample and the prediction target sample may be calculated based on a distance of x-axis between the first reference sample and the prediction target sample and a distance of y-axis between the first reference sample and the prediction target sample.

Figure 17:
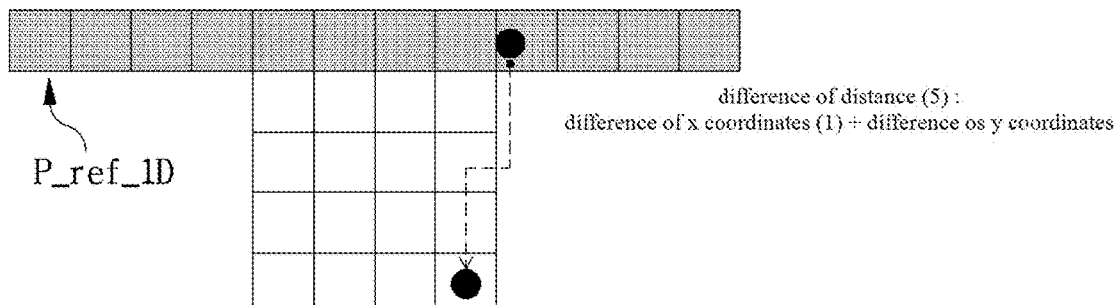
FIG. 17 is a diagram for explaining a distance between a first reference sample and a prediction target sample.

FIG. 17 is a diagram for explaining a distance between a first reference sample and a prediction target sample. In FIG. 17, it is exemplified that a distance between the first reference sample and the prediction target sample is calculated by summing an absolute value of an x-coordinate difference between the first reference sample and the prediction target sample and an absolute value of a y-coordinate difference between the first reference sample and the prediction target sample.

As an example, it is possible to compare a distance between the prediction target sample and the first reference sample with a threshold value, and then determine whether to generate a second prediction image according to the result of the comparison. The threshold value may be determined depending on a width, height, intra prediction mode (for example, whether it is a directional intra-prediction mode) of the prediction block or a slope of the intra prediction mode.

The first reference sample used in the first intra prediction can be set as the second reference sample. For example, if a plurality of reference samples are used in the first intra prediction, any one of the plurality of reference samples may be set as the second reference sample.

Alternatively, a reference sample located at a position different from the first reference sample may be set as the second reference sample. At this time, the first reference sample and the second reference sample may be adjacent to the same boundary of the current block, or may be adjacent to different boundaries of the current block. For example, both the first reference sample and the second reference sample may be top reference samples of the current block or left reference samples of the current block, or either the first reference sample or the second reference sample is the top reference sample while the other is the left reference sample.

Figure 18:
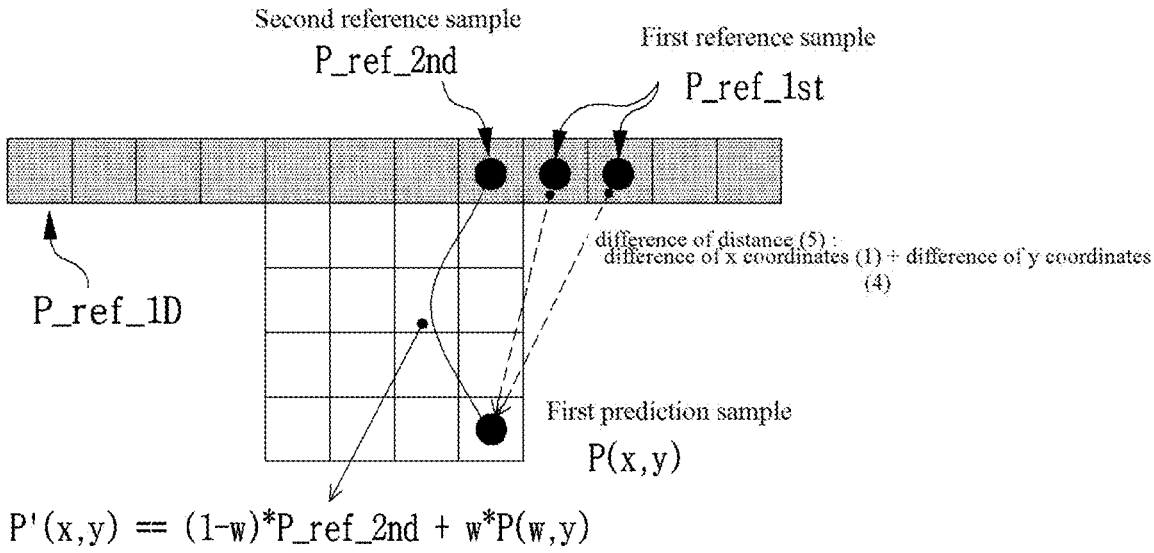
FIGS. 18 and 19 are diagrams showing positions of a first reference sample and a second reference sample.
Figure 19:
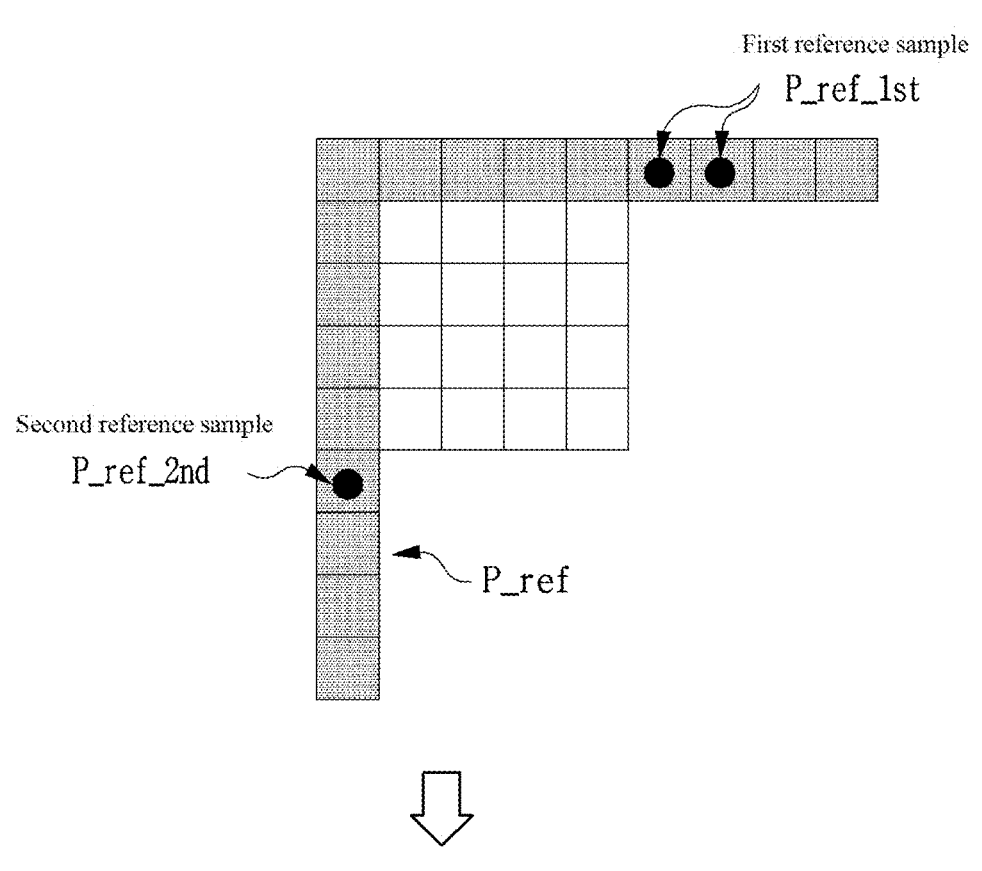
Figure 19:
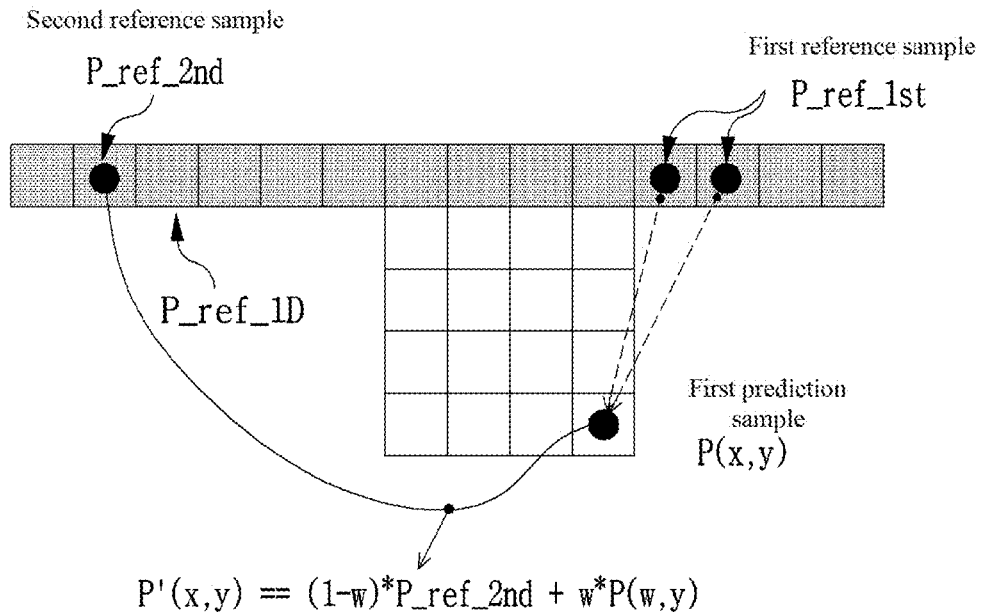

FIGS. 18 and 19 are diagrams showing positions of a first reference sample and a second reference sample.

FIG. 18 shows an example in which the first reference sample and the second reference sample are adjacent to the same boundary of the current block, and FIG. 19 shows an example in which each of the first reference sample and the second reference sample are adjacent to different boundaries of the current block.

Specifically, it is depicted in FIG. 18 that both the first reference sample and the second reference sample are the top reference samples of the current block, and it is depicted in FIG. 19 that the first reference sample of the current block is the top reference sample while the second reference sample is the left reference sample of the current block.

The second reference sample may include a reference sample closest to the prediction target sample. Here, the reference sample closest to the prediction target sample may include at least one of a reference sample lying on the same horizontal line as the prediction target sample or a reference sample lying on the same vertical line as the prediction target sample.

Alternatively, a reference sample neighboring to the first reference sample may be determined as the second reference sample.

As another example, the second reference sample may be determined based on the directionality of the intra prediction mode of the current block. For example, the second reference sample may be specified by an imaginary angular line following the slope of the intra-prediction mode of the current block. For example, when the angular line is extended to both sides, the reference sample located on one side of the angular line may be set as the first reference sample, and the reference sample located on the other side of the angular line may be set as the second reference sample.

Figure 20:
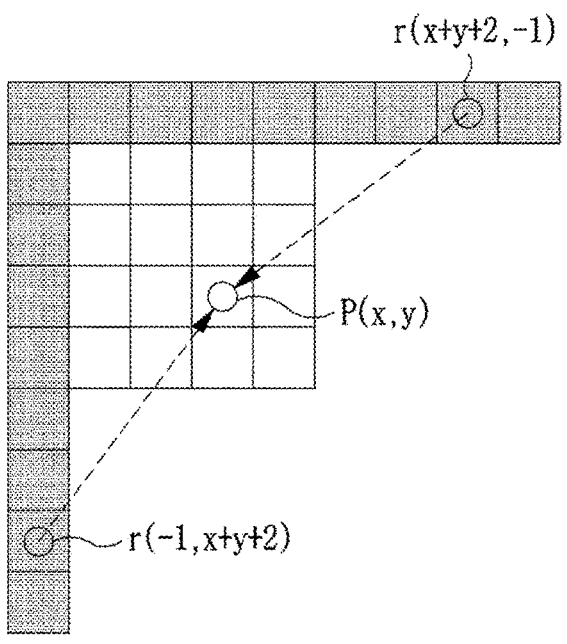
FIG. 20 is a diagram showing positions of a first reference sample and a second reference sample.

FIG. 20 is a diagram showing positions of a first reference sample and a second reference sample. If it is assumed that that the intra prediction mode of the current block is a left-bottom diagonal direction (for example, Mode 2 shown in FIG. 8) or a top-right diagonal direction (for example, Mode 34 shown in FIG. 8), when the angular line defined by the intra prediction mode is extended to both sides from the prediction target sample, reference samples located at positions passing through the angular line may be set as the first reference sample and the second reference sample. For example, when the intra prediction mode of the current block is the top-right diagonal direction, a reference sample located at a position of r(x+y+2, −1) is determined as the first reference sample and a reference a reference sample located at a position of r(−1, x+y+2) is determined as the second reference sample for the prediction target sample located at (2, 2). On the other hand, when the intra prediction mode of the current block is the left-bottom diagonal direction, a reference sample located at a position of r (−1, x+y+2) is determined as the first reference sample and a reference sample located at a position of r (x+y+2, −1) is determined as the second reference sample for the prediction target sample located at (2, 2).

Alternatively, a reference sample at a predefined location may be set as the second reference sample. For example, a reference sample adjacent to a top-left corner of the current block, a reference sample adjacent to a top-right corner of the current block, or a reference sample adjacent to a left-bottom corner of the current block may be set as the second reference sample.

A plurality of reference samples may be selected as the second reference sample. For example, a plurality of reference samples satisfying a condition described above may be selected as the second reference samples for second intra prediction The second prediction image may be generated by weighted sum of the first prediction image and the second reference sample. For example, the following Equation 10 represents an example of generating a second prediction image P' (x, y) for a prediction target sample (x, y) through a weighted sum of a second reference sample P_ref_2nd and a first prediction image P(x, y).

$$P'(x, y) = (1 - w) * P\_ref\_2nd + w * P(x, y) \qquad \text{[Equation 10]}$$

Since the first prediction image is generated by copying the first reference sample or interpolating a plurality of the first reference samples, it can be understood that the second prediction image is generated through a weighted sum of the first reference sample P_ref_1st and the second reference sample P_ref_2nd.

Weights assigned to each of the first prediction image and the second reference sample may be determined based on at least one of a size of the current block, a shape of the current block, an intra prediction mode of the current block, a position of the prediction target sample, a position of the first reference sample or a position of the second reference sample. For example, the weights assigned to each of the first prediction image and the second reference image may be determined based on a distance between the prediction target sample and the first reference sample or a distance between the prediction target sample and the second reference sample.

For example, when the distance between the prediction target sample and the first reference sample is f1 and the distance between the prediction target sample and the reference sample is f2, a weighted prediction parameter w may be set as f2/f1, f1/f2, f2/(f1+f2), or f1/(f1+f2).

The final prediction image of the prediction target sample may be determined as the first prediction image or the second prediction image. At this time, whether to determine the first prediction image as the final prediction image or whether to determine the second prediction image as the final prediction image may be determined according to a size of the current block, a shape of the current block, an intra prediction mode of the current block, position of the prediction target sample, or the like. For example, the final prediction image of the prediction target samples included in a first area in the current block is determined as the first prediction image, while the final prediction image of the prediction target samples included in a second area, which is different from the first area, is determined as the second prediction image.

Intra prediction for the current block may be performed using a plurality of intra prediction modes.

For example, different intra prediction modes or different directional intra prediction modes may be applied to each prediction target sample in the current block. In order to determine an intra prediction mode of each prediction target sample, information indicating an intra prediction mode difference value with a previous prediction target sample may be signaled through the bitstream.

For example, the current block may be divided into a plurality of regions, and different intra prediction modes may be applied to each region. Here, the plurality of regions may be generated based on a unit of a predetermined number of samples, or a unit of a block having a predetermined size/shape. For example, the current block may be divided into a plurality of sub-blocks of a predetermined shape/size. Alternatively, the plurality of regions may be generated based on a unit of a predetermined row/column in the current block. For example, an area including both boundary rows/columns of the current block may be set as a first area, and the remaining area may be set as a second area, so that different intra prediction modes may be applied to the first area and the second area.

As another example, a method of multiple prediction of a current block using a plurality of intra prediction modes may be used. For example, a first prediction block for the current block is generated using a first intra prediction mode, a second prediction block for the current block is generated using a second intra prediction mode, and then a final prediction block for the current block is generated using the first prediction block and the second prediction block. At this time, the final prediction block of the current block may be generated based on a weighted sum, an average, a maximum value, or a minimum value of the first prediction block and the second prediction block. When the final prediction block is generated by applying a predetermined weighting filter to the first prediction block and the second prediction block, filter coefficients applied to the first prediction block and the second prediction block may be predefined in the encoder and the decoder. For example, the filter coefficients of the weighting filter applied to the first prediction block and the second prediction block may be {½, ½}. Alternatively, the filter coefficients may be variably determined based on an encoding parameter related to the filter. Alternatively, the filter coefficients to be applied to the first prediction block and the second prediction block may be determined based on a difference value between the first intra prediction mode and the second intra prediction mode or their directionality.

Hereinafter, an intra prediction scheme using a plurality of intra prediction modes will be referred to as a multiple intra prediction method. For convenience of explanation, it is assumed that the number of intra prediction modes used in the multiple intra prediction method is two, and each of two intra prediction modes will be referred to as a first intra prediction mode and a second intra prediction mode.

Figure 21:
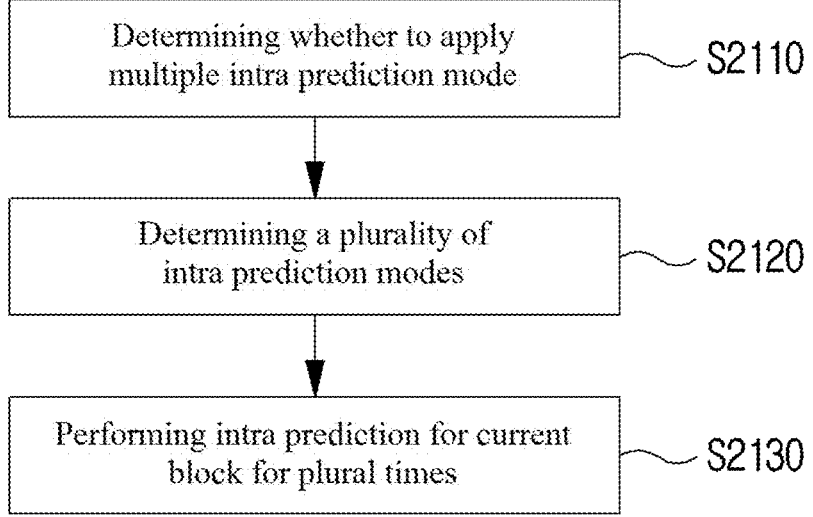
FIG. 21 is a flowchart illustrating a multiple intra prediction method according to an embodiment of the present invention.

FIG. 21 is a flowchart illustrating a multiple intra prediction method according to an embodiment of the present invention. Not all processes shown in FIG. 21 are essential, so the present invention may be implemented by omitting some processes. In addition, FIG. 21 will be described in a sequential order, but the present invention can also be implemented in a different order from shown in the drawing.

Referring to FIG. 21, it may be determined whether to apply a multiple intra prediction method to a current block S2110. Whether or not to use the multiple intra prediction method for the current block may be determined by a size or a shape of the current block. Alternatively, according to a first intra prediction mode of the current block, it may be determined whether to use the multiple intra prediction method for the current block. For example, when the first intra prediction mode is a directional prediction mode, the multiple intra prediction method in which a non-directional prediction mode (e.g., DC or Planar) is set as a second intra prediction mode may be used. When the first intra prediction mode is a non-directional mode, it is also possible that the multiple intra prediction method may be not allowed to use or it may set to use the multiple intra prediction method in which both the first intra prediction mode and the second intra prediction mode are non-directional prediction modes.

In another example, information indicating whether to use the multiple intra prediction method may be signaled through the bitstream. Here, the information may be a flag of 1 bit.

If it is determined that the multiple intra prediction method is to be applied, a plurality of intra prediction modes for the current block may be derived S2120. A first intra prediction mode and a second intra prediction mode used in the multiple intra prediction method may have different angles or different directions. For example, the first intra prediction mode and the second intra prediction mode may be directional intra prediction modes having different directions. Alternatively, one of the first intra prediction mode and the second intra prediction mode may be a non-directional intra prediction mode and the other may be a directional prediction mode. When the first intra prediction mode is a non-directional mode, it is also possible to set the second intra prediction mode to have a non-directional mode. Since the first intra prediction mode and the second intra prediction mode are different from each other, a range of reference samples used for first intra prediction based on the first intra prediction mode and a range of reference samples used for second intra prediction based on the second intra prediction mode be different from each other.

At least one of the first intra prediction mode and the second intra prediction mode may be specified by information signaled through the bitstream or may be derived based on an intra prediction mode of a neighboring block adjacent to the current block. Information indicating a difference value between the first intra prediction mode and the second intra prediction mode may be signaled through the bitstream. For example, if the first intra prediction mode is derived based on an intra prediction mode of a neighboring block and/or information (e.g., MPM flag, MPM index, remaining mode information, etc.) signaled via the bitstream, the second intra prediction mode may be determined based on information indicating the difference value between the first intra prediction mode and the second intra prediction mode.

Alternatively, the second intra prediction mode may be derived based on the first intra prediction mode. For example, the second intra prediction mode may be derived by adding or subtracting a predetermined constant value (e.g., an integer of 1, 2, 3, etc.) to the value of the first intra prediction mode, or may be derived by adding or subtracting a predetermined value (e.g., 180 degrees) to an angle of the first intra prediction mode.

Alternatively, the second intra prediction mode may be set to a default mode predefined in the encoder or decoder. For example, the default mode may be a non-directional mode such as DC or Planar, or a mode having a specific directionality such as Horizontal or Vertical.

If a plurality of prediction modes for the current block are determined, intra prediction for the current block may be performed using the plurality of prediction modes S2130. As described above, intra prediction of the current block may be performed by applying different intra prediction modes for each sample unit, applying different intra prediction modes for each region, or sequentially applying the plurality of intra prediction modes. It will be described in detail for an example in which the multiple intra prediction is performed by applying different intra prediction modes in a predetermined area, particularly in a unit of sub-block.

Figure 22:
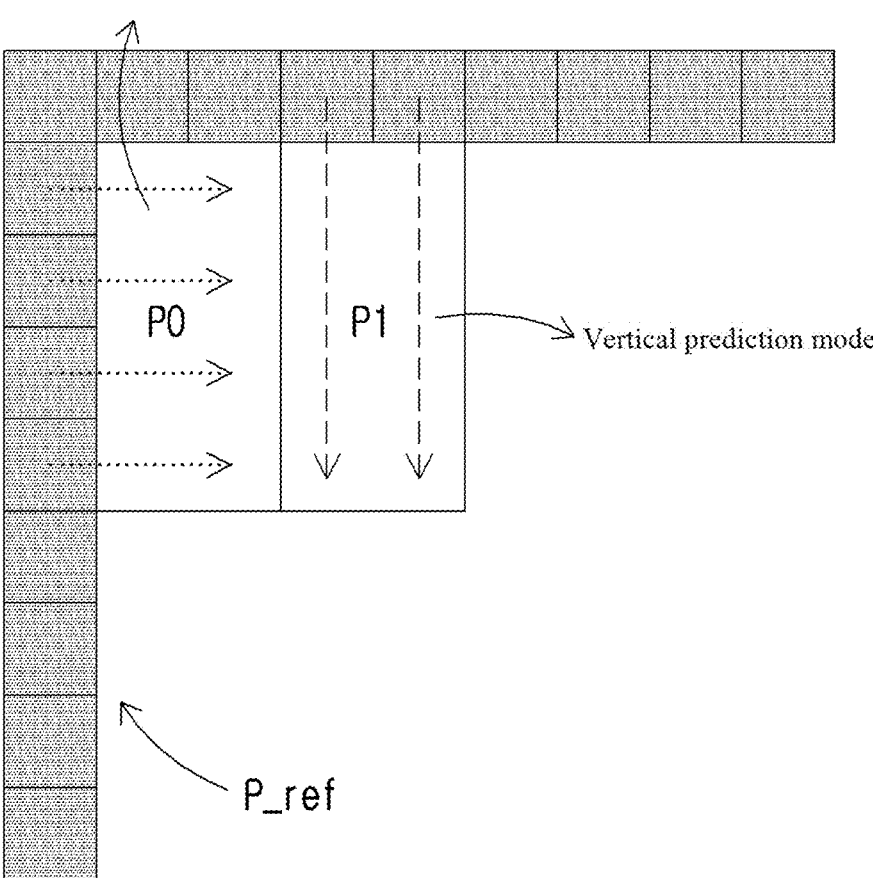
FIG. 22 is a diagram illustrating an example in which multiple intra prediction is performed in a unit of a sub-block.

FIG. 22 is a diagram illustrating an example in which multiple intra prediction is performed in a unit of a sub-block.

After dividing the current block into a plurality of sub-blocks, different intra prediction modes may be applied to each sub-block. As in the example shown in FIG. 22, sub-blocks may have the same size/shape. Unlike the illustrated example, it is also possible to divide the current block into a plurality of sub-blocks having different sizes/shapes.

In addition, sub-blocks may be square or non-square blocks. Alternatively, it is also possible to divide the current block so that the sub-block has a triangular shape or a polygonal shape having at least 5 vertices.

A sub-block may be defined as an area including at least one row and/or at least one column. For example, a sub-block may be defined to include the first column, the last column and the first row in the block, or a sub-block may be defined to include the last row and the last column in the block.

In the example shown in FIG. 22, it is illustrated that a horizontal direction prediction mode is applied to a left sub-block (sub-block P0), and a vertical direction prediction mode is applied to a right sub-block (sub-block P1). As in the illustrated example, different intra prediction modes may be used for each sub-block to generate prediction samples.

Also, a range of reference samples used to perform intra prediction for each sub-block may be different. For example, the sub-block P0 may be intra predicted by using left reference samples adjacent to a left of the current block, and the sub-block P1 may be intra predicted by using top reference samples adjacent to a top of the current block.

Depending on intra prediction mode of each sub-block, a range of reference samples used therefor may be partially overlapped. Accordingly, a reference sample at a predetermined position may be used both for the first intra prediction mode and the second intra prediction.

When different intra prediction modes are used for each sub-block, blocking artifacts may occur at boundaries between sub-blocks. Thus, for samples adjacent to a boundary of a sub-block, a boundary filter may be applied to reduce artifacts. For example, a sample adjacent to a boundary of a sub-block may be replaced with a weighted sum of the sample adjacent to the boundary of the sub-block and a neighboring sample included in another sub-block. Whether or not the boundary filter is applied may be determined based on a size/shape of the current block or the sub-block, or a difference value between the first intra prediction mode and the second intra prediction mode.

Figure 23:
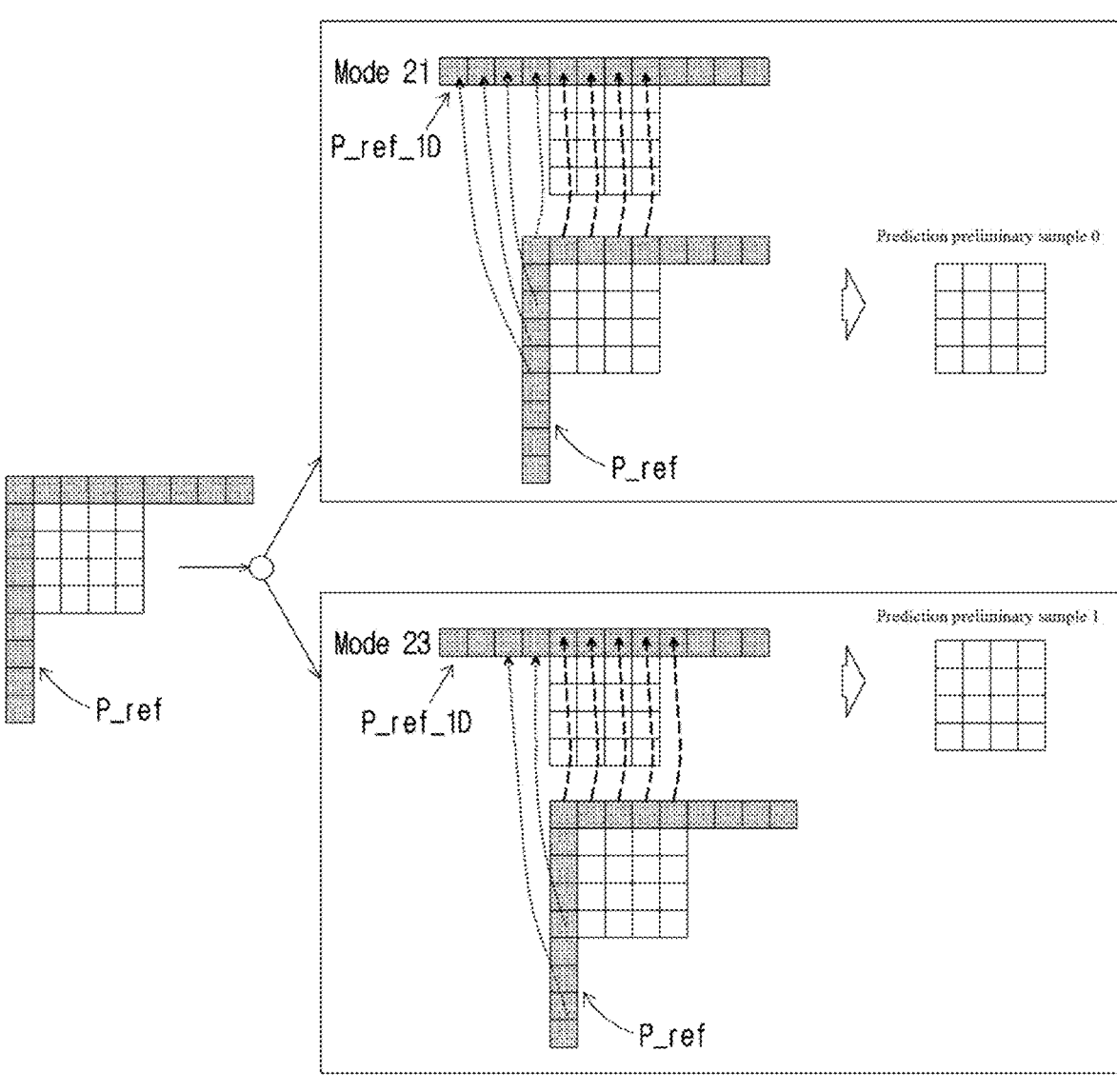
FIG. 23 is a diagram showing an example of obtaining a prediction block in a unit of a sub-block.

FIG. 23 is a diagram showing an example of obtaining a prediction block in a unit of a sub-block.

Different one-dimensional reference samples may be generated for each of a plurality of intra prediction modes applied to a current block. Intra prediction for the current block may be performed for a plurality of times using the intra prediction modes and one-dimensional reference samples corresponding thereto, thereby generating a plurality of intra prediction samples. Each intra prediction sample generated as results of plural times of intra prediction can be referred to as an intra prediction preliminary sample.

A prediction sample for a sub-block may be generated based on at least one of a plurality of intra prediction preliminary samples.

For example, if the current block is divided into two sub-blocks, two intra prediction preliminary samples may be generated by performing intra prediction for the current block for two times. In the example shown in FIG. 23, an intra prediction preliminary block 0 is generated by applying an intra prediction mode of Mode 21 to the current block, and an intra prediction preliminary block 1 is generated by applying an intra prediction mode of Mode 23 to the current block.

At this time, the intra prediction preliminary block 0 may be used as a prediction block of the first sub-block in the current block, and the intra prediction preliminary block 1 may be used as a prediction block of the second sub-block in the current block. Specifically, an intra prediction preliminary sample corresponding to a position/size of a sub-block may be set as a prediction sample of the sub-block.

For example, as in the example illustrated in FIG. 22, if the current block is divided into two sub-blocks of N×2N sizes, N×2N samples in a left side of the intra prediction preliminary block 0 may be set as prediction samples of a left sub-block PC, and N×2N samples in a right side of the intra prediction preliminary block 1 may be set as prediction samples of a right sub-block P1.

As described above, a prediction sample of the current block may be generated by combining the intra prediction preliminary block 0 and the intra prediction preliminary block 1.

Alternatively, based on a weighted sum of a plurality of intra prediction preliminary samples, an intra prediction mode of each sub-block may be obtained. For example, prediction samples of the first sub-block and the second sub-block may be obtained based on a weighted sum of an intra prediction preliminary block 0 and an intra prediction preliminary block 1. At this time, the weights applied to the intra prediction preliminary block 0 and the intra prediction preliminary block 1 may be different for each sub-block. For example, for the first sub-block, a larger weight may be assigned to the intra prediction preliminary block 0, but for the second sub-block, a larger weight may be assigned to intra prediction preliminary block 1.

It is also possible to apply a weighting operation of intra prediction preliminary samples to only samples located at a boundary of a sub-block. For example, FIG. 24 shows an example in which a weighting operation is applied to a sample located at a boundary of a sub-block.

Figure 24:
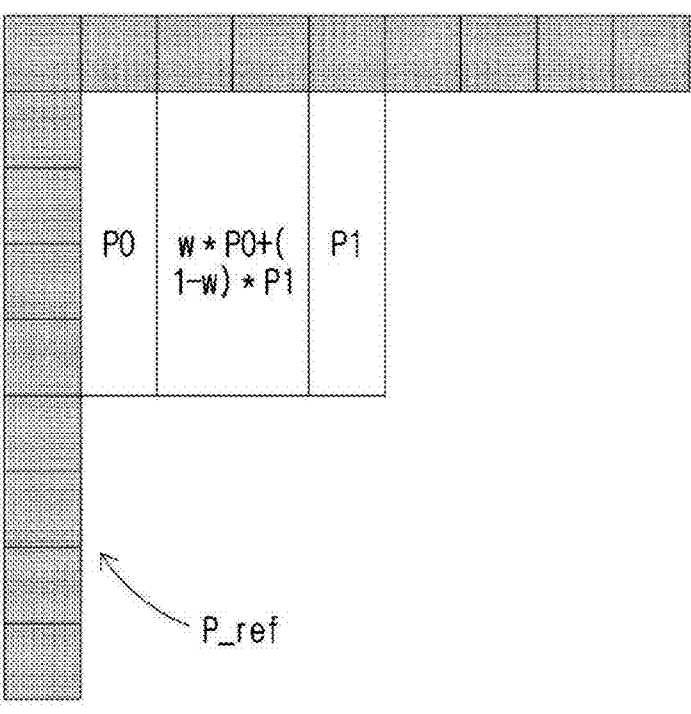
FIG. 24 shows an example in which a weighting operation is applied to a sample located at a boundary of a sub-block.

As in the example shown in FIG. 24, the intra prediction preliminary block 0 is used as a prediction block of the first sub-block, and the intra prediction preliminary block 1 is used as a prediction block of the second sub-block. At this time, for samples adjacent to a boundary of the first sub-block and the second sub-block, a prediction sample may be generated based on an weighted sum between the intra prediction preliminary block 0 and the intra prediction preliminary block 1.

Equation 11 shows an example in which a prediction sample is generated based on the weighted sum between the intra prediction preliminary block 0 and the intra prediction preliminary block 1.

$$P = w * P0 + (1 - w) * P1 \qquad \text{[Equation 11]}$$

In Equation 11, P0 represents an intra prediction preliminary sample included in intra prediction preliminary block 0, and P1 represents an intra prediction preliminary sample included in intra prediction block 1. In addition, in Equation 11, the weight w may be a real number between 0 and 1. The weight w may be determined by information signaled via the bitstream or may be derived variably according to an intra prediction related encoding parameter, a position of P0/P1 prediction preliminary sample, a distance between the prediction preliminary samples or an angle of an intra prediction mode.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method for decoding a video, the method comprising:
splitting a coding block into a plurality of coding blocks, a current block being a leaf node coding block which is one of the plurality of coding blocks;
determining a partition type of the current block;
obtaining a first prediction block based on first prediction information for a first partition included in the current block;
obtaining a second prediction block based on a second prediction information for a second partition included in the current block, the second prediction information being different from the first prediction information,
wherein the partition type of the current block is selected from a plurality of partition type candidates,
wherein the plurality of partition type candidates includes a candidate in which at least one of the first partition and the second partition has a triangle shape,
wherein a final prediction sample included in a boundary region relating to the first partition and the second partition is obtained by a weighted sum operation performed by assigning a first weight, greater than 0, to a first prediction sample in the first prediction block and assigning a second weight, greater than 0, to a second prediction sample in the second prediction block,
wherein a final prediction sample outside the boundary region and included in the first partition is set as the same as a first prediction sample in the first prediction block, and a final prediction sample outside the boundary region and included in the second partition is set the same as a second prediction sample in the second prediction block, and
wherein whether a multiple prediction method, in which both the first prediction information and the second prediction information are used together with partitioning the current block, is applied to the current block or not is determined based on a size of the current block.

2. The method of claim 1, wherein directionality of the first prediction information is different from directionality of the second prediction information.

3. The method of claim 1, wherein the first weight and the second weight are determined based on a position of the final prediction sample.

4. A method for encoding a video, the method comprising:
splitting a coding block into a plurality of coding blocks, a current block being a leaf node coding block which is one of the plurality of coding blocks;
determining a partition type of the current block;
obtaining a first prediction block based on first prediction information for a first partition included in the current block; and
obtaining a second prediction block based on second prediction information for a second partition included in the current block, the second prediction information being different from the first prediction information,
wherein the partition type of the current block is selected from a plurality of partition type candidates,
wherein the plurality of partition type candidates includes a candidate in which at least one of the first partition and the second partition has a triangle shape, wherein a final prediction sample included in a boundary region relating to the first partition and the second partition is obtained by a weighted sum operation performed by assigning a first weight, greater than 0, to a first prediction sample in the first prediction block and assigning a second weight, greater than 0, to a second prediction sample in the second prediction block,
wherein a final prediction sample outside the boundary region and included in the first partition is set as the same as a first prediction sample in the first prediction block, and a final prediction sample outside the boundary region and included in the second partition is set the same as a second prediction sample in the second prediction block, and
wherein whether a multiple prediction method, in which both the first prediction information and the second prediction information are used together with partitioning the current block, is applied to the current block or not is determined based on a size of the current block.

5. The method of claim 4, wherein directionality of the first prediction information is different from directionality of the second prediction information.

6. The method of claim 4, wherein the first weight and the second weight are determined based on a position of the prediction sample.

7. A non-transitory computer-readable medium for storing data associated with a video signal, comprising:
a data stream stored in the non-transitory computer-readable medium, the data stream being encoded by an encoding method which comprising:
splitting a coding block into a plurality of coding blocks, a current block being a leaf node coding block which is one of the plurality of coding blocks;
determining a partition type of the current block;
obtaining a first prediction block based on first prediction information for a first partition included in the current block; and
obtaining a second prediction block based on second prediction information for a second partition included in the current block, the second prediction information being different from the first prediction information,
wherein the partition type of the current block is selected from a plurality of partition type candidates,
wherein the plurality of partition type candidates includes a candidate in which at least one of the first partition and the second partition has a triangle shape,
wherein a final prediction sample included in a boundary region over the first partition and the second partition is obtained by a weighted sum operation performed by assigning a first weight, greater than 0, to a first prediction sample in the first prediction block and assigning a second weight, greater than 0, to a second prediction sample in the second prediction block,
wherein a final prediction sample outside the boundary region and included in the first partition is set as the same as a first prediction sample in the first prediction block, and a final prediction sample outside the boundary region and included in the second partition is set the same as a second prediction sample in the second prediction block, and
wherein whether a multiple prediction method, in which both the first prediction information and the second prediction information are used together with partitioning the current block, is applied to the current block or not is determined based on a size of the current block.

* * * * *